United States Patent
Waters

(10) Patent No.: US 7,797,309 B2
(45) Date of Patent: Sep. 14, 2010

(54) SYSTEM AND METHOD FOR SEARCH PARAMETER DATA ENTRY AND RESULT ACCESS IN A LAW ENFORCEMENT MULTIPLE DOMAIN SECURITY ENVIRONMENT

(75) Inventor: Jonathan S. M. Waters, Tallahassee, FL (US)

(73) Assignee: Datamaxx Applied Technologies, Inc., Tallahassee, FL (US)

( * ) Notice: Subject to any disclaimer, the term of this patent is extended or adjusted under 35 U.S.C. 154(b) by 408 days.

(21) Appl. No.: 11/759,314

(22) Filed: Jun. 7, 2007

(65) Prior Publication Data
US 2008/0307503 A1 Dec. 11, 2008

(51) Int. Cl.
G06F 7/00 (2006.01)
G06F 17/30 (2006.01)
(52) U.S. Cl. .................. 707/718; 707/755; 707/771
(58) Field of Classification Search .................. None
See application file for complete search history.

(56) References Cited

U.S. PATENT DOCUMENTS

| | | | | |
|---|---|---|---|---|
| 5,564,119 A * | 10/1996 | Krawchuk et al. | ............. | 707/4 |
| 6,173,284 B1 | 1/2001 | Brown | | |
| 6,621,422 B2 * | 9/2003 | Rubenstein | ................. | 340/988 |
| 7,181,493 B2 | 2/2007 | English et al. | | |
| 2004/0031024 A1 * | 2/2004 | Fairweather | ................. | 717/143 |
| 2004/0066305 A1 * | 4/2004 | Rubenstein | ................. | 340/692 |
| 2004/0249667 A1 * | 12/2004 | Oon | ............................ | 705/2 |
| 2005/0289612 A1 * | 12/2005 | Morton et al. | ................ | 725/76 |
| 2007/0150387 A1 * | 6/2007 | Seubert et al. | ................ | 705/31 |
| 2007/0162957 A1 * | 7/2007 | Bartels | ......................... | 726/2 |

OTHER PUBLICATIONS

Hsinchun Chen, Jenny Schroeder, Roslin V. Hauck, Linda Ridgeway, Homa Atabakhsh, Harsh Gupta, Chris Boarman, Kevin Rasmussen, Andy W. Clements Coplink Connect: information and knowledge management for law enforcement Elsevier Science B.V.2002.*
NLETS Operator's Lesson Plan http://www.in.gov/isp/files/NLETS_File.pdf Feb. 2005.*
Preference SQL—Design, Implementation, Experiences Werner Kießling, Gerhard Köstler Proceedings of the 28th VLDB Conference Hong Kong, China, 2002.*

* cited by examiner

Primary Examiner—Neveen Abel Jalil
Assistant Examiner—Polina Peach
(74) Attorney, Agent, or Firm—James Richards

(57) ABSTRACT

A system and method for law enforcement query entry that enables universal platform access without requiring specialized platform software by utilizing a keystroke efficient lexicon for data entry that is converted to standardized search commands by a back end server and by displaying search results in accordance with user, platform, network, and data security constraints.

18 Claims, 21 Drawing Sheets

Fig. 6

| Code | Function | Parameter 1 | Optional Parameters |
|---|---|---|---|
| A | Article Check | Serial number | Type |
| B | Boat Check | Hull Number or Registration Number | |
| C | Criminal Record Check | ID Number | State |
| D | Person Check by DL | OLN number | State |
| F | Female Person check by name | Name (F,M,L) | DOB |
| G | Gun Check | Serial Number | Make, Caliber |
| H | Hazardous Materials | UNN number or Tank car # | |
| I | Image Query | Image ID number | |
| L | Log User Activity | Information to be logged | |
| M | Male Person check by name | Name (F,M,L) | DOB |
| O | Protective Order Check | Name (F,M,L) | DOB, Sex |
| P | License Plate | Plate Number | State, Type |
| S | Person Check by Social Security number | SSN | |
| T | Send a Message To a User | User ID | Message Text |
| U | Unit Status from CAD | Unit ID | |
| V | Vehicle check by VIN number | VIN | State, Vehicle Make |
| W | Severe Weather Check | State | |
| X | Specific Function | Agency specific transaction | Agency specific |
| Y | Reserved for future use | | |
| Z | Emergency message to agency | Message data | |
| ? | Help | | |

```
                                    1700
         1708     1706        1704                      1702
        |12345678|12345678|1234567890123456|123456789012345678901234567890 12|
        |reserved|system  |    temporal    |            number               |
```

```
              1710
Fig. 17C   |ABCDEFGHIJ|
```

SYSTEM AND METHOD FOR SEARCH PARAMETER DATA ENTRY AND RESULT ACCESS IN A LAW ENFORCEMENT MULTIPLE DOMAIN SECURITY ENVIRONMENT

RELATED APPLICATIONS

This application contains related disclosure to concurrently filed application Ser. No. 11/759,441 titled "System and Method for Efficient Indexing of Messages in a Law Enforcement Data Network," by Jonathan Waters, which is incorporated herein by reference in its entirety.

BACKGROUND

1. Field of the Invention

The present invention pertains generally to the field of data search request entry and search result access among multiple terminals, devices, users, and databases in a layered security environment, more particularly in a Law Enforcement and Criminal Justice related network environment.

2. Background of the Invention

Access to Law Enforcement and Criminal Justice data is becoming increasingly important to more authorized individuals on a daily basis. Also, new technology is providing a much wider array of physical access options for such personnel.

Due to the implementation of current Law Enforcement and Criminal Justice systems, it is difficult to provide secure, easy to use access, for authorized personnel without extensive system and software development on the physical devices used. Furthermore, the structures of the existing systems require extensive training for the end users of such systems, and are not intuitive to the user.

Coupled with the rate of technological change of devices such as personal Digital Assistants, there are many challenges for an agency that wishes to grant access from a variety of devices, with a variety of physical infrastructures, including, but not limited to, the need to develop unique applications for each device, the need to develop security procedures for each device and the need to train users on the unique characteristics of the applications that have been developed for that device.

These problems are compounded when a specific user may access data from several different devices and or locations, such as from a cell phone, a desk top or a Personal Digital Assistant.

Security is another concern. The National Crime Information Center ("NCIC", a division within the federal Bureau of Investigation) has strict rules for the access and security of data that is accessed via their databases, and all access must be made in compliance with the NCIC Criminal Justice Information Security policies.

Further, there is an increasing need for the permanent keeping of records of transactions with these databases for future review of historical case activity. The compiling of a permanent record presents challenges with respect to efficient and speedy access of records in such a massive database.

Thus there is a need for a system that allows a secure, intuitive access for authorized personnel to access Law Enforcement and Criminal Justice databases from any type of physical communications device with no specific software application (out side of manufacture supplied generic applications) installed on that device and without specialized training for the end users of such devices. There is further a need for a database and method of accessing that can handle the data volume anticipated for decades of use while providing fast access to the data without requiring changes in the current network infrastructure.

BRIEF DESCRIPTION OF THE INVENTION

The present invention pertains to a system and method for law enforcement query entry that enables universal platform access without requiring specialized platform software by utilizing a keystroke efficient lexicon for data entry that is converted to standardized search commands by a back end server and by displaying search results in accordance with user, platform, network, and data security constraints.

One aspect of the invention includes a keystroke efficient lexicon with inferential syntax wherein the lexical processing is performed at the server, thus enabling the use of simple cell phones or other devices as entry terminals. The keystroke efficient lexicon speeds entry of data on all terminals and can generate multiple parallel requests in different formats directed to different data source systems.

In one embodiment, a single character transaction code may be adjacent to a data field, without the need for entering a delimiter. The data field type and order of data fields may be detected and interpreted by a property of the data field, such as whether the data field is all numeric characters, whether the field or a portion of the field can be found in a table of valid values, the length of the field, or another property or feature of the field. In one embodiment a transaction code may define one or more data fields associated with the transaction code.

In another embodiment, a number of characters may be used as delimiters at the convenience of the user to allow the use of different keyboards. The alternative delimiters may include space, dash, period, comma, colon, semicolon, and hyphen.

In one aspect of the invention, the input message may be translated to multiple formats for multiple data source servers and sent to multiple data source servers based on user and group permissions and preferences and based on the message type.

Another aspect of the invention includes a multi faceted permission security hierarchy for display of results, thus further enabling the use of low and medium security devices to participate at an appropriate level in the network while permitting full capability on fully authorized terminals. The security hierarchy allows for departmental and interagency data access and sharing agreements and limitations, thus fostering interconnection with all data sources.

These and further benefits and features of the present invention are herein described in detail with reference to exemplary embodiments in accordance with the invention.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

FIG. 6 shows a table with an exemplary set of universal transaction codes with parameters and optional parameters that may be entered for each one.

FIG. 17A shows an exemplary Universal Message Number (UMN) in native format for a typical 32 bit machine.

FIG. 17B illustrates an exemplary operator visual display format in accordance with the present invention.

FIG. 17B shows the user display format as would be used for the 89th message from the date of Apr. 11, 2007.

FIG. 17C illustrates the context field format for the UMN.

DETAILED DESCRIPTION OF THE INVENTION

Figure 1:
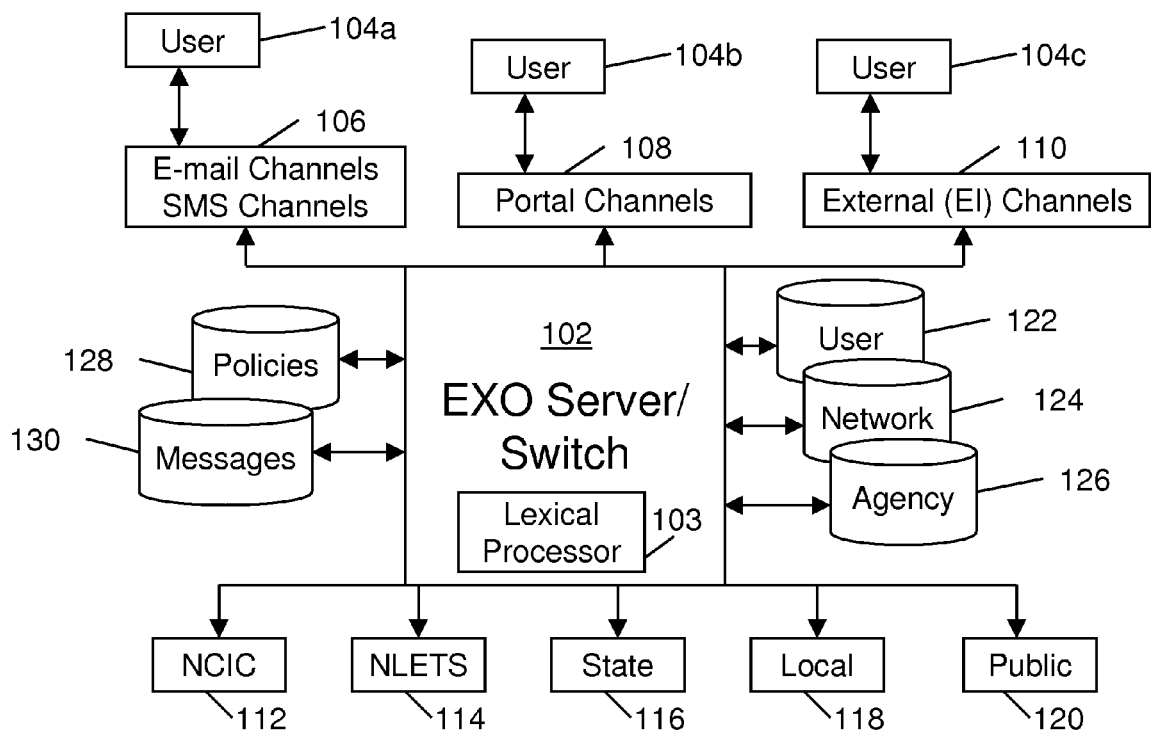
FIG. 1 illustrates the basic interconnects of a system in accordance with the present invention.

The present invention pertains to a system for accessing Law Enforcement, Criminal Justice, and related data efficiently, and rapidly from a wide range of terminal devices. The system opens up the field of eligible user terminal devices by enabling access from any device with messaging or email capabilities including devices, such as cell phones, with minimal keyboards, no security, and with no special installed software. The system may be used with devices supporting text messaging (Short Messaging Service, SMS) that is pervasive on the majority of new devices widely available to the public. The system can even enable an officer, such as an off duty officer, to borrow a cell phone from anyone at the scene of an emergency to enter data and receive basic query responses. The system accommodates a wide range of terminal device security capabilities by defining a security structure that permits the display of response data in accordance with the security attributes for the user, terminal, and channel to the user.

Throughout this disclosure an exemplary system embodiment used to illustrate elements and features of the invention is referred to as Exemplary System Omni-access (EXO). One should understand that EXO is discussed for illustration purposes only and that the many potential features of EXO are not all required to practice the invention.

The exemplary system, EXO, may include a number of aspects and features contributing to the benefits described herein.

EXO may include a keystroke efficient data entry lexicon and inferential syntax processing that enables data entry on minimal keyboards, such as from cell phones, and speeds entry on full keyboard devices.

EXO may include a multi faceted permission security hierarchy for entry of queries and display of results, thus further enabling the use of low and medium security devices to participate at an appropriate level in the network while permitting full capability on fully authorized terminals.

EXO may further include a message indexing method that allows permanent archival of each query and the associated response data according to a permanently assigned message number called a Universal Message Number (UMN). A "message" refers to a unit of information communicated in a Law Enforcement network. A message, for example, may be a query for information on a person based on a driver's license number. The message may reach a server and spawn additional messages to state drivers license databases and crime databases. Each database may then respond with response messages routed back to the user. Response messages may include the UMN of the original query message so that responses may be directed and organized relative to the originating query. The invention provides a method for mapping the UMN to a control field in presently established message protocol standards so that the UMN can be used with the current message infrastructure. Within this disclosure, the UMN may refer to a particular instance of a number or the set of numbers or values available to the number according to one or more defined formats. A number having the same value in a different format means that there is a one to one correspondence between the representations for the value in the respective formats according to a defined conversion or mapping algorithm.

User Access to Criminal Justice and Law Enforcement Databases.

FIG. 1 illustrates the basic interconnects of a system in accordance with the present invention. Referring to FIG. 1, the exemplary system server, EXO 102 negotiates data flow from each data source to each user 104 in accordance with policies that may be specific to any particular data source or network. The system includes a database which includes user data 122, network data 124, agency data 126, and database security policies 128 that control the flow of data. The system may also include a database of historical messages 130.

EXO is connected to data sources. The data sources range from local 118 and State 116 interconnection systems, e.g., Florida Crime Information Center, (FCIC) to national systems, e.g., National Crime Information Center 112 (NCIC), National Law Enforcement Telecommunication System® 114 (NLETS®) to generally available data sources, e.g., Public Records 120, Hazardous Materials (HazMat), Vehicle Tracking, etc. Reference to law enforcement data, databases, or data sources within this disclosure refers to NCIC, NLETS, FCIC and other state databases, as well as any related agency database or public database, individually or collectively.

EXO has channels to connect to users. Channels include each different type of interconnect that may require separate security consideration. Channels include e-mail and SMS (Short Message Service, also known as text messaging) 106, portal channels 108, such as web browsers, and external channels 110, such as direct connections to users. EXO has a lexical processor 103 to convert user commands to a format appropriate for each data source.

Figure 2:
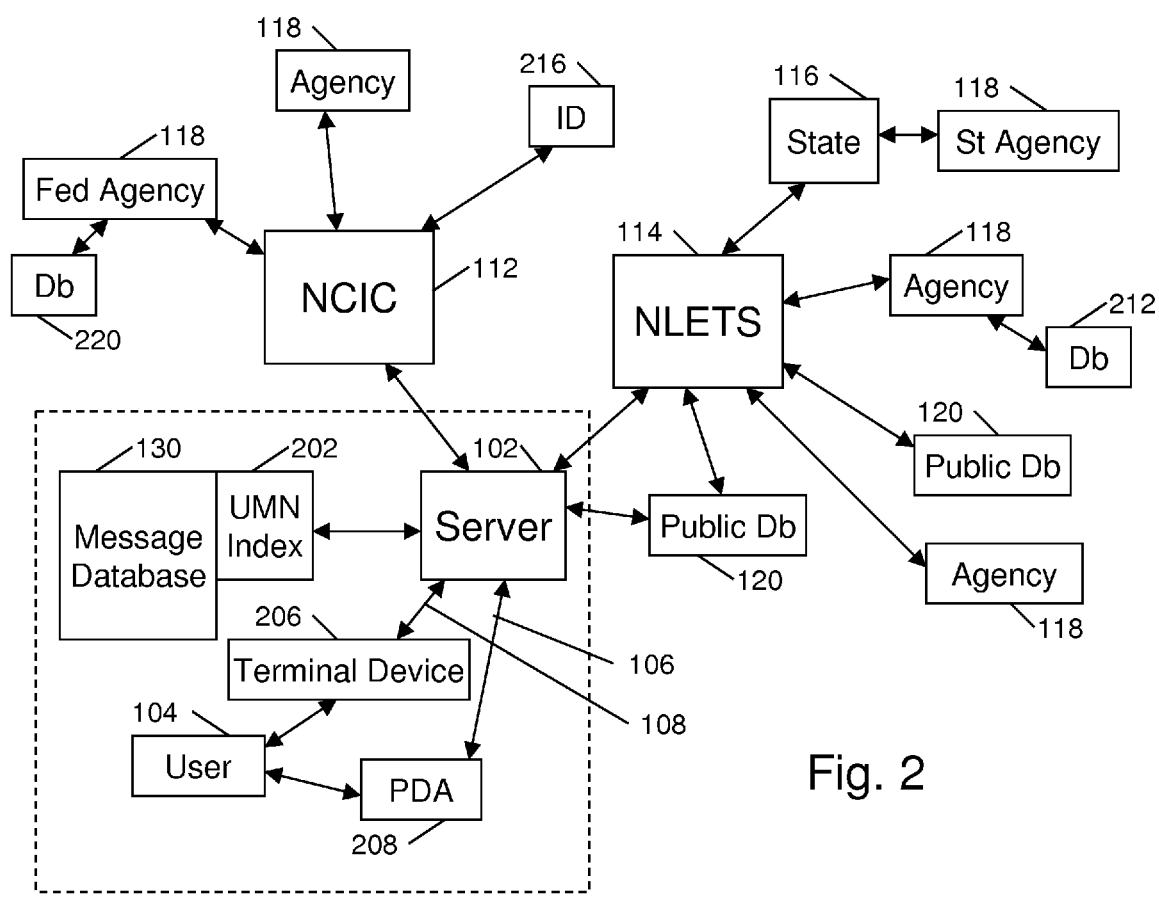
FIG. 2 further illustrates interconnections among users and data sources.

FIG. 2 further illustrates interconnections among users and data sources. Referring to FIG. 2, the EXO server 102 may receive inputs from a user 104 through a fully enabled secure workstation 206 or through a less enabled Personal Digital Assistant 208 or other cell phone type device that may have little or no security. (Note that some cell phone devices may have full security.) The server 102 then translates the input message to a format appropriate for each connected database system (alternatively referred to as data sources or data source servers) and may send the translated message to any number of database systems. The database systems may themselves be collections of database systems, such as the NCIC 112 and NLETS® 114. NCIC 112 may then forward the message to a number of Federal or local agencies 118 that may operate various databases 220, such as fingerprint databases or social security ID databases 216 and such. NLETS® 114 also may connect to agencies 118 and state networks 116, such as Florida Crime Information Center, which then may connect to state agencies 118 that operate databases 212. NLETS® 114 and others may also provide access to public data sources 120. Various public data sources 120 may be accessed directly from EXO 102.

EXO 102 also includes a message database 130 containing all messages handled by EXO. The message database 130 includes all query messages from users and all response messages from external databases. The message database is indexed by a unique Universal Message Number (UMN) 202 assigned to each message. The UMN 202 has a format with sufficient capacity to permanently store messages in accordance with a unique value UMN for each message. The message database may also be indexed by a user ID value that relates all originating and returned messages to the user.

Figure 3:
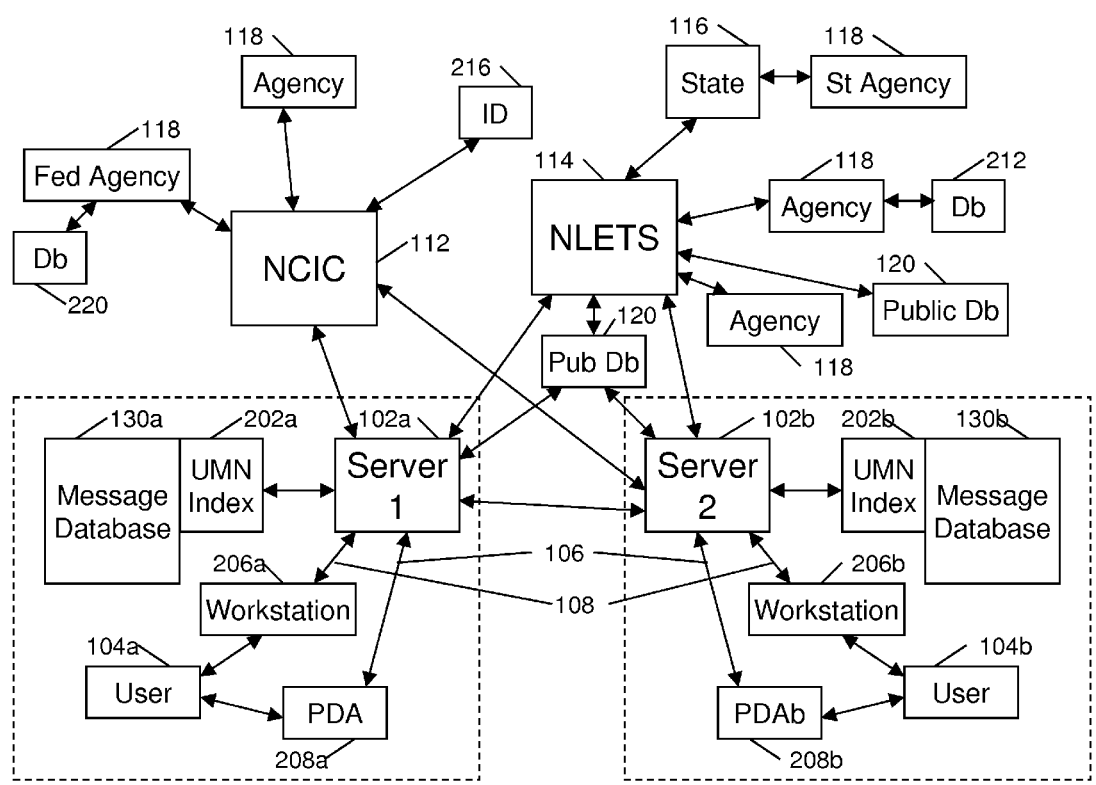
FIG. 3 illustrates the operation of two independent systems in accordance with the present invention.

FIG. 3 illustrates the operation of two independent systems in accordance with the present invention. Referring to FIG. 3, two servers 102a and 102b operate two different systems serving different users. The systems 102a and 102b may operate independently or may interchange data as needed. Each system may maintain its own message database 130a and 130b. The respective UMN 202a and 202b may also contain a field to designate the system so that messages may be distinguished from one system to the other, as will be further explained later in this disclosure.

Figure 4:
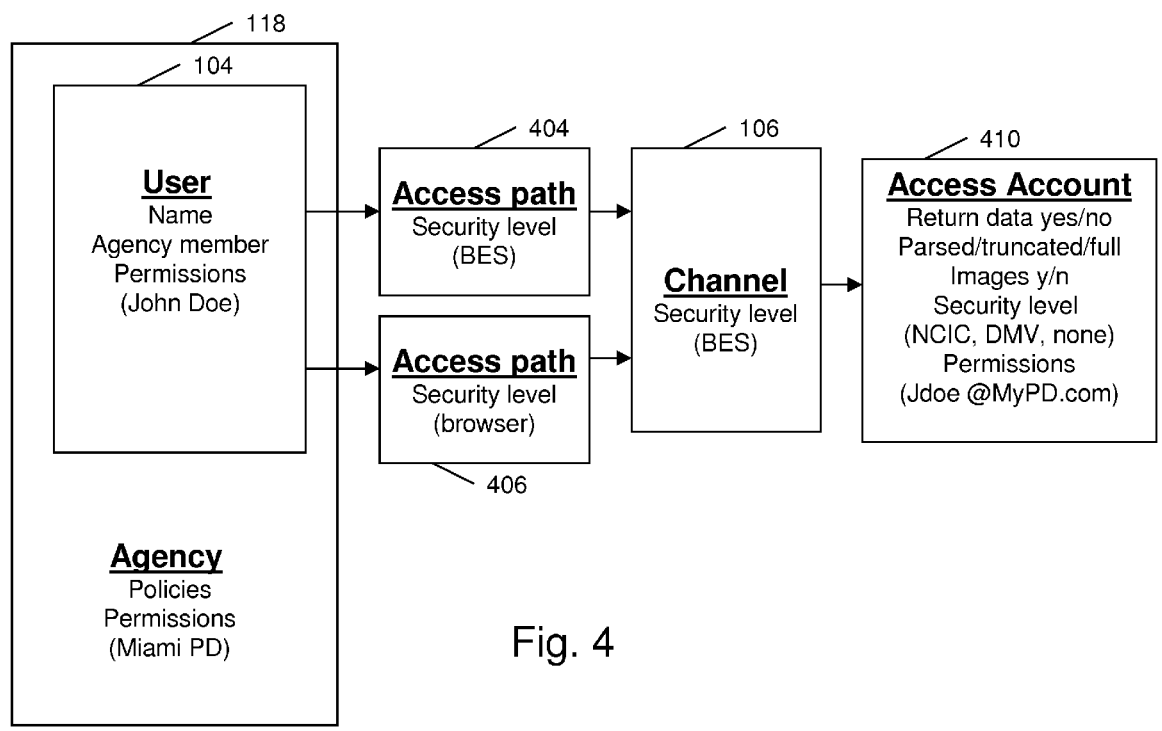
FIG. 4 illustrates the various relationships involved in connecting a user to the server.

FIG. 4 illustrates the various relationships involved in connecting a user to the server. Referring to FIG. 4, a user 104 is a member of an agency 118. Agencies may be defined in various terms, ranging from a Police department in Florida to a Federal Agency to a civilian agency. The user may contact the user's server access account 410 through an access path 404 connected to a channel 106 associated with the access account 410. Each element in the path has associated security levels, permissions, and policies that dictate which information may be received from or sent to the user 104 and which databases and external connections may be accessed. For example, although the user 104 may be allowed access for certain data, the access path 406 device (web browser) may not have sufficient security to pass the data.

A channel 106 is a processing interface technology such as Electronic Mail, Portal Messaging, or Internet Search engine that provides access to the server for the end users.

An agency 118 has "Access Paths". This defines the interface structure (which server, which protocol, etc) that is used for the agency's own servers that provide input to EXO.

A user 104 may be authorized for one or more of the data sources that are available to the agency of which the user is a member, again, depending on policies, and certifications. A certification is granted to an end user who is qualified for access to various functions within the system.

A user 104 has access accounts 410. An access account 410 is analogous to an E-mail (or similar) address. For example, a Blackberry® user may have jdoe@myblackberry.cingular.com or "ImAnyPdCop@nypd.org". A user may also have desktop type accounts that are accessed from a browser.

An access account 410 has properties. These properties range from return data formats (Yes/No, parsed, truncated, full, attachments for images, no images, etc), security levels (fully secured for NCIC, partially for DMV, etc), function permissions (e.g. only HazMat or such queries). The access account 410 that receives a message will determine what functions can be performed. Note that the formatting properties still do not speak to the actual device type, but provide a convenience factor. An individual user may take advantage of several different channels, depending on the access account properties.

An agency 118 has access to data sources in accordance with rules and policies. For example an FCIC agency may access the FCIC, HazMat and Public Records, but not directly the NCIC or NLETS®. An agency also typically has a "Terminal Access Control Officer (TAC) function. TAC is a person who is responsible for ensuring the appropriate and authorized (and legal) access to all components of the NLETS® system. The TAC's location is generally always manned or attended in such a manner that decisions can be made to take action, when needed. This manned location acts as a point of contact for critical messages, such as "Wanted Persons" notifications that may be received.

Security Processing.

The EXO server operates in a "trusted server" environment, i.e., the logon processing and user validation is performed by standard software and hardware that is validated and controlled by standard security practices. Note that this processing could be part of the EXO system in a Network Operations Center (NOC), which may be a shared BlackBerry® Enterprise System™ (BES™) server for Blackberry, for example, or could be performed elsewhere (e.g. a BES server at New York Police Department (NYPD), a secure server at Los Angeles Police Department (LAPD), etc).

Note that a BlackBerry® device and BES™ are significant in that, depending on model and configuration, BES™ can support connection security adequate for NCIC data. The use of a BlackBerry® example within this disclosure, however, is intended for exemplary purposes only. Any terminal or device having adequate security may be used.

In one embodiment, the user may be authorized remotely, e.g., at NYPD, and may send a message through the NYPD server to the EXO server.

The account verification process will identify the user and agency. From the collected properties of the linkages, the transactions permitted transactions can be determined. That is, the most restricted properties of the access account, the access path, the agency and the user define the permissions for the connection.

Data returned will be sent or queued based on the response path security considerations. For example, a request sent via a non-secure cell phone may be processed, but secure response data (e.g. an NCIC response) may be routed to a separate access account, with only a notification that a response exists being sent to the user at the first access account. This allows the user to take alternate action. Depending on security policies, it may be possible to provide a HIT/NoHIT response to low security terminals, without providing the supporting data.

The availability of a central delivery point as described above is beneficial to the operation of the system.

Typical Processing Scenario.

Figure 5:
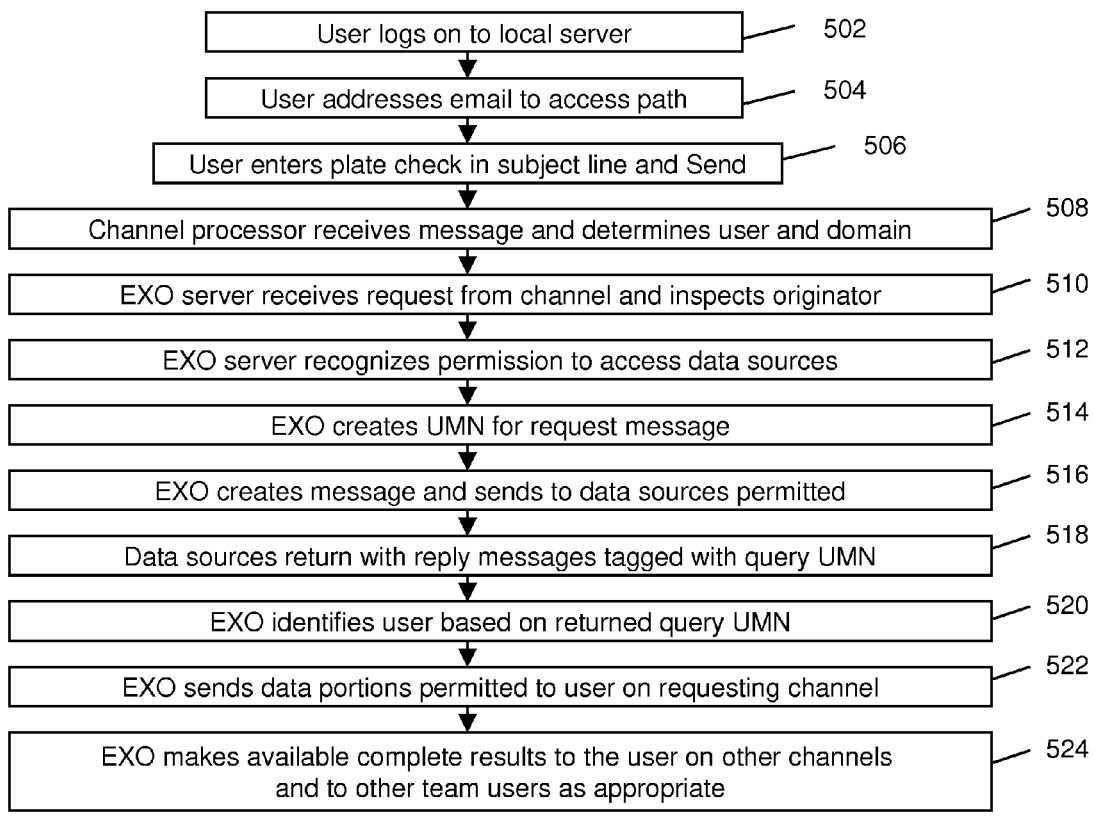
FIG. 5 illustrates an exemplary operational flow using an exemplary system in accordance with the present invention.

FIG. 5 illustrates an exemplary operational flow using an exemplary system in accordance with the present invention. Referring to FIG. 5, the following is a possible operational flow from an agency such as NYPD, using a Blackberry® (any model that supports BES):

1. The user (for example at New York Police Department, "NYPD" who may be referenced by "ImAnyPdCop") logs on to his BES server 502.

2. The user addresses an E-mail to exo@dmx.com, using his thumb from the address book 504.

4. The user requests a plate check via "P ABC123" in the subject line 506.

5. The user sends the transaction 506.

3. The EXO channel "dmx.com" receives the message and decomposes it to a user and domain 508.

6. The EXO server receives the request and inspects the originator 510.

7. The EXO server recognizes permission to access the NYPD system and other data sources such as NCIC and NLETS® 512.

8. EXO creates a unique reference (Universal Message Number, "UMN") and saves the query in the EXO database 514. User identification and address information may also be saved with the query.

9. EXO creates a message or messages and sends the message to the various data sources that are authorized for that user to access 516, in the format appropriate for that format.

10. The data sources return various messages to the EXO server. (Note that there may be other users' messages intermingled as there may be multiple users active and responses may arrive within any time frame and order from the data sources) 518. EXO assigns new message numbers to the return messages and stores the return messages with linkage to the originating message based on the UMN reference in the response message.

11. The EXO server identifies the user based on the UMN reference in the response message 520. The UMN may be used to retrieve user information associated with the query message stored in the database.

12. The EXO server calculates the permitted destination(s) from the permissions and policies of the data sources that have responded to the request 522.

13. The EXO server delivers the results to the user via the appropriate channel 522, i.e., some of the data may be blocked, but stored for later display when the user logs on from a secure terminal, or may be redirected to another team member who has a secure terminal 524. The selection of data to send to each terminal may be referred to as filtering the data in accordance with a security attribute.

Components Involved.

One component in the EXO operation is that of EXO server, which manages all access by the channels and calculates the available data sources and return routing based on security profiles.

Another component is the implementation of the "Universal Message Number" processing, which may be used to track all messages within the system, and relate request to their return responses.

EXO processing may be completely "server side", i.e., the essential processing may be accomplished without loading any specialized software on the user terminal. However, even if some specialized functions are desired or required by concerns outside EXO processing, EXO would not know or care. One example may include a Binary Runtime Environment for Wireless® (BREW) application for CDMA phones by Qualcomm, Inc., San Diego.

Expanded Processing Model.

EXO itself is a transaction processor that "reaches out" for messages, but also can have message "pushed to it". In the case of a locally hosted sever, it will "reach out" to the BES/Exchange server to get the requests. However, there are also configurations that may require a somewhat different approach.

Take the example of the ImAnyPdCop@nypd.org. It is assumed that there is a secure link from the NYPD server to the EXO server, which does exist. However, normally the NYPD BES/Exchange server would send that type of external message via the Internet, unless configured otherwise. Changing some of these routing configurations within an agency may be difficult, and might meet with resistance.

An alternate approach would be to configure EXO to read an account at NYPD (or any agency, for that matter). In this case, the NYPD users would send to exo@nypd.org and the EXO server would use that account as the communications channel, which would effectively be transparent to EXO. This model then expands to any agency that is on a State network that can be reached via the NLETS® communications interface, thus preserving the security model. Effectively, EXO takes a "your server or ours" approach, and does not care.

In the case where a direct or NLETS® type connection is not available and the Internet must be used, there are at least two approaches. Either a Virtual Private Network (VPN) can be implemented into the EXO NOC or an "agent" can be deployed that is a simple Web Service that access the user server, encrypts the request using appropriate FIPS-140-2 and sends it to EXO via the Internet. The response data would return via a pair of "Web Services". "Web Services" are industry standard communications components that are used to exchange data amongst disparate systems.

Keystroke Efficient Lexicon and Lexical Processing

In accordance with the present invention, user inputs may be entered using a keystroke efficient lexicon and open content driven syntax that can be translated to standard query commands by a back end server. The server may then route queries to various data sources as established for the data type at the server and in accordance with data interchange rules.

In the current Law Enforcement Data handling systems, there are strict rules and formats that must be followed when making request to the Law Enforcement and Criminal Justice system, especially for queries involving persons, property (e.g. guns) and vehicles.

The general form of queries to the National Crime Information center is as follows, as documented in the "National Crime Information Center Operations Manual":

"FunctionCode.agencyid.Search Parameters"

Where:

"Function Code" is a two to four character data string defining the function to be performed "agencyid" is a nine character agency identification code assigned by NCIC "Search parameters" are data elements in a strict format (and often order) required to complete the search.

For example, to query a stolen vehicle by license plate "ABC123" from an agency in Florida, the following would be used:

"QV.FL9999999.LIC/ABC123.LIS/FL"

As an example, to query a male person "John Doe, born on Mar. 31, 1949, the following would be used:

"QW.FL9999999.NAM/DOE,JOHN.DOB/19490331.SEX/M"

For functions that must access data in other systems but must traverse the NLETS® system the functions may be even more complicated. The general format of an NLETS® function is as follows, as documented in the "National Law Enforcement Telecommunications System Operations Manual":

"FunctionCode.agencyid.Destinationsystem.Search Parameters"

Where:

"Function Code" is a two to four character data string defining the function to be performed "agencyid" is a nine character agency identification code assigned by NCIC "Destinationsystem" is a two character code indicating the system to which this function should be sent.

"Search parameters" are data elements in a strict format (and often order) required to complete the search.

For example, to query the driver license status of an individual in Arizona (John Doe, Male, born Mar. 31, 1949) from a system in Florida, the following would be used:

"DQ.FL9999999.AZ.NAM/DOE,JOHN.DOB/19490331.SEX/M"

Not only are the strings required to be exact in all cases, the contents of each field must be in a specified format, which can be cumbersome. Furthermore, the format of the date fields (e.g. Date of Birth) may change from function to function, and not be consistent across all processing systems. Thus extensive training is required for a user, and the data formats are not intuitive.

In order to mitigate these issues partially, many systems provide "formats" into which the user types data (in the prescribed format). This means, though, that an application must be loaded on the device to create the formats and the user trained on that application. The lexical parsing of the present invention totally eliminates the need for any such applications.

The lexical parsing removes all those restrictions by the following.

1) The function (e.g. "QW") is replaced with a single code that is intuitive and also in some cases provides one of the data elements (e.g. the "Sex" code).

2) The agency identifier is inserted automatically by the server based on the profile.

3) The order of the fields is not important, and the meaning of each field is inferred by the parser using various data analysis techniques, such as an all numeric field that can be inferred as to have a valid date of birth under the rules of the function.

4) The delimiters are free form and are detected from a list which avoids multiple keystrokes on a hand held device.

5) The lexical parser combines all the received data and creates the output string as requested for the exact system to which it is addressing the function.

The increased flexibility in entry formats may be illustrated by the following example. Any of the following (amongst others) could be entered by the user to create the driver license query as described above from Florida to Arizona:

TABLE 1A

| Example | Input String |
|---|---|
| 1 | MJOHN, DOE, 033149, AZ |
| 2 | M JOHN DOE 19490331 AZ |
| 3 | MAZ, 03311949, JOHN, DOE |

Referring to Table 1A, in example 1, "M" is the transaction code. There is no space separating "M" and "JOHN", the first field. No space is needed because the transaction code is fixed length. The remaining fields are separated by commas, resulting in the following set of data fields: "JOHN", "DOE", "033149", and "AZ". "AZ" is recognized as a state code because it is found in a state code table. "033149" is recognized as a date because it is all numeric characters. "JOHN" and "DOE" are the remaining fields of alpha characters and are taken in sequence as first and last name.

The same principles apply to example 2. Note that the delimiters are spaces. Note also that the date is an eight character format, which can be recognized by the number of characters and decoded or parsed into year, month, and day accordingly. Note also that a space was placed between "M" and "JOHN". The space is optional as all delimiters are deleted once the fields are parsed.

Example 3 illustrates that the order does not matter. Note also that the order of the date fields, month-day-year differs from that of example 2, year-month-day. The two formats may be distinguished by noting that the two valid centuries 19 and 20 are invalid months. Thus, if 19 or 20 are the first two digits of an eight digit date, the year-month-day format is used.

Thus, the fields may be entered in any sequence and any of several formats, yet the data may be correctly parsed and interpreted based on features of the data itself.

Alternatively, the transaction code may be placed at the end of the input string. This accommodates users who prefer to enter the data first and then decide how to use the data. In one embodiment, the selection of placing the transaction code at the first or last may be a configuration parameter selection on account setup. Table 1B shows the exemplary inputs of Table 1A with the transaction code at the end of the input string.

TABLE 1B

| Example | Input String |
|---|---|
| 1 | JOHN, DOE, 033149, AZM |
| 2 | JOHN DOE 19490331 AZ M |
| 3 | AZ, 03311949, JOHN, DOEM |

The data fields are then assembled into the standard command using a standard command template:

"DQ.FL9999999.dest.NAM/nnn.DOB/dddddd.SEX/s"

where,

DQ is the function code;

FL9999999 is an exemplary requesting agency ID;

dest is the destination state code;

NAM/designates a name to follow;

DOB/designates a date of birth to follow; and

SEX/designates a sex to follow.

Inserting appropriate data into the above template yields:

"DQ.FL9999999.AZ.NAM/DOE,JOHN.DOB/19490331.SEX/M"

The result is a total of 47 characters compared with 19 characters for example 1 above.

In a further advantage, a single entry command could (if configured as such) also create and send a query function to NCIC in the NCIC required format. Thus, from a single input, EXO can create far ranging queries to multiple data sources.

The user simply enters the data in the order that the user sees fit and as meets the needs of the situation. This is intuitive to the user and does not require any knowledge of the format of the function itself that must be generated.

The benefits of the lexicon and inferential syntax include rapid entry of query data on any platform, universal platform access, support of cell phones, PDA's (personal digital assistants) and other minimal keyboard devices. Together with the layered display security protocol, allows the use of any available terminal for data entry, i.e. an off duty officer at a scene may use anyone's cell phone to enter data or request searches, thereby increasing the speed of response to an incident. Data entry is simplified, encouraging the entry of more data.

Several properties of the lexicon include: single character transaction codes, acceptance of a wide range of alternative delimiters, inferential data interpretation. The single character transaction codes minimize keystrokes. The acceptance of most non-data characters as delimiters simplifies the use of restrictive keyboards, where access to what may be considered common characters on a standard desktop or laptop keyboard are accessed by multiple keystrokes on a handheld device. Examples include "." or "," characters on a RIM BLACKBERRY® device. Thus, the user may choose a delimiter with the fewest keystrokes for the terminal in use.

To further simplify data entry, inferences are drawn from the entered data, were possible, to determine data type properties, thereby eliminating the need for separate data type entry. For example, with hazardous materials, a UNN code has a four numeric digit format, whereas a railcar has a format always beginning with an alphabetic character. Thus the determination of the type of code can be inferred from the first character being numeric or alphabetic and the entry of the type of code can be eliminated from the user entry requirement, reducing keystrokes, and speeding and simplifying the entry process.

In order to allow for this type of operation, the server must be able to interpret the data deterministically, and make processing decisions based on the data provided. Accordingly, a general transaction format for data entry is defined as follows:

T{s}{d}parameter-1{d}paramete-r2{d} . . . Parameter-n.

Where:

'T' is a transaction code from a fixed list, as shown below,

{s} is an optional secondary transaction code, as defined by an agency,

{d} is a delimiter from the delimiter set, as defined below, and

Parameter-1 through parameter-n are input data elements to the transaction. Parameters may also be referred to as data fields.

The delimiter between the transaction code (or the secondary code) and the first data field is optional. Extraneous embedded spaces and delimiters will also be ignored, allowing user flexibility and reducing unnecessary error messages.

An alternate format as illustrated in Table 1B where the transaction code is placed at the end of the string is as follows:

parameter-1{d}paramete-r2{d} . . . Parameter-n{d}{s}T

Where:

'T' is a transaction code from a fixed list, as shown below,

{s} is an optional secondary transaction code, as defined by an agency,

{d} is a delimiter from the delimiter set, as defined below, and

Parameter-1 through parameter-n are input data elements to the transaction. Parameters may also be referred to as data fields.

The delimiter between the transaction code (or the secondary code) and the last data field is optional. Extraneous embedded spaces and delimiters will also be ignored, allowing user flexibility and reducing unnecessary error messages.

These combined aspects allow for the simplest form of data entry possible, with a minimum of activity by the user. Note that the delimiter between the Transaction code and the adjacent parameter is optional, as the transaction codes have a predetermined length.

The transaction codes are divided into two groups, as follows:

1) Universal functions that are provided for general query purpose germane to all agencies.

2) Specific functions that are germane only to a specific agency.

The difference between these two groups may be illustrated by example. An exemplary universal function may be defined as: "person check by driver's license". A request made with this function will spawn requests to all configured data sources, including possible an agency's own Records Management System (RMS). An agency "RMS" is a database that contains records pertinent to functions within a local level that do not necessarily have national visibility, but are germane to a local municipality or similar political organization such as a county. However, that agency may have a unique function that is applicable only to its users, such as "query intelligence data base by licenses plate." The former is considered a universal function, the latter a specific function.

The input transaction format allows for a mix and match of universal and specific functions, with specific functions being configured at an agency level.

Transaction Codes.

Exemplary (not all inclusive) Universal Transaction codes (for the universal functions) and possible parameters are described in this section. After the first parameter which is a fixed data element, others may follow in any order or presence. Note that the first parameter may be defined as at least one of multiple mutually exclusive data elements but the actual element can be determined from the data content, i.e., the parameter order may be flexible and up to the user with the parameter type being determined by inference from the data entered.

FIG. 6 shows a table with an exemplary set of universal transaction codes with parameters and optional parameters that may be entered for each one. FIG. 6 is exemplary in that other codes for other functions may be added or codes shown may be assigned different values or may have different fields. In one embodiment the codes may be upper or lower case for the same function. In an alternative embodiment, the upper and lower case letters may designate different functions or special features of the same basic function.

Delimiters

Any of the following characters shown in Table 2 may be used as a delimiter. Delimiter character selection may be mixed and matched in any transaction. The delimiter characters have been chosen as a common subset of handheld devices and provide single character entry on standard desktop or laptop keyboards. An exemplary set of permitted delimiters includes:

TABLE 2

| Char | Name |
|---|---|
|   | Space |
| . | Period |
| , | Comma |
| : | Colon |
| ; | Semicolon |
| ! | Exclamation point |
| * | Asterisk |
| + | Plus sign |
| - | Dash |
| / | Slash |

Data Element Processing

The data element processing is based on the property that a field usually may be identified by content. To cover for rare instances where conflicts and mis-assessments may arise, several techniques may be employed. Where the data are obviously in error and the value is a non-critical value, the value may be ignored to avoid unnecessary error messages and repeated entry. As a further measure to ensure reliable entry, a text summary of the fields as they are processed may be provided as immediate feedback, so the user can be informed of how the entry is interpreted.

Figure 7A:
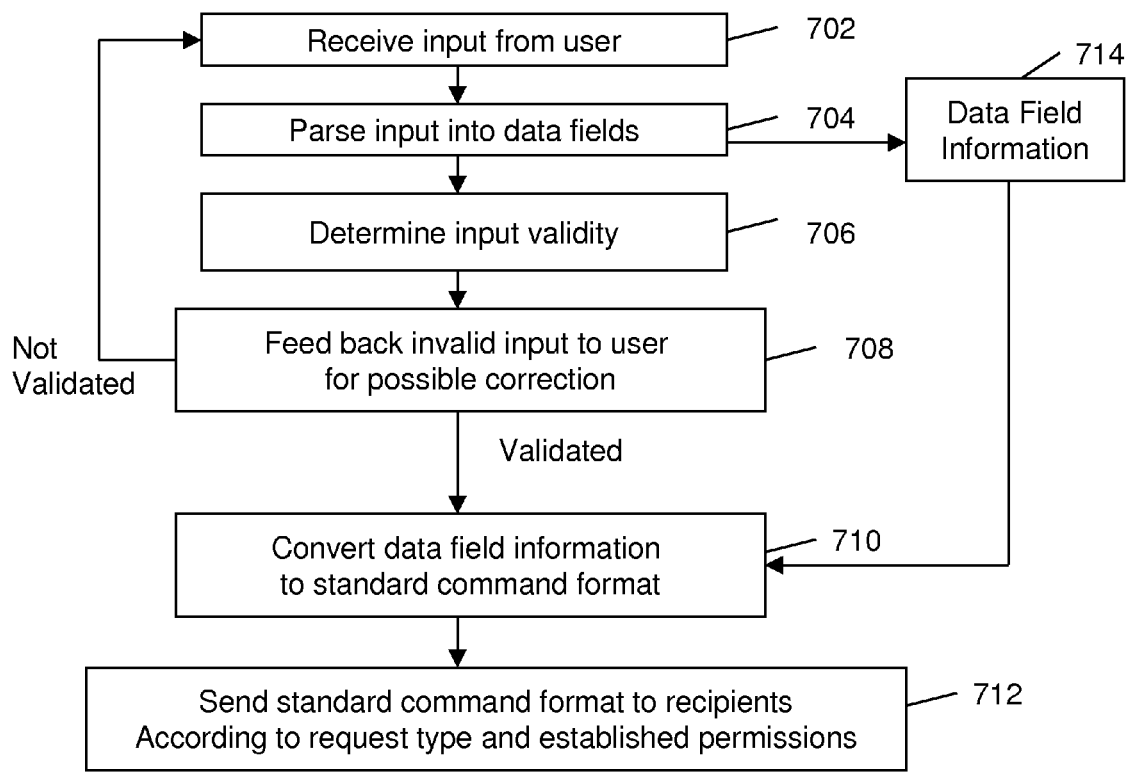
FIG. 7A shows the steps for processing a user input and generating a query message.

The details of lexical input processing may be better understood with reference to FIG. 7A. FIG. 7A shows the steps for processing a user input and generating a query message. In FIG. 7A, an input is received from the user 702. The input is then parsed into data fields 704. The characters between delimiters are identified as a data field character string. Delimiters are removed and each string is stored 714 separately. The parsing process depends on the command and data structure entered by the user. Certain characteristics (also referred to as properties or features) in the data may be used to interpret the type of data in each field, such as whether the field is all numeric or all alphabetic characters, or if the string can be found in a table.

Once the input is parsed, any signs of invalid data, such as date out of range, or string not found in a table, may be noted 706. If the data are invalid, the data may be displayed 708 to the user for correction. If the input is valid, the system then converts the data field information to standard format 710. The type of command, together with user account defaults, are referenced to determine the various destinations for the query. Since each database system may have its own required format, each different request would be converted to the appropriate format for the target database. The resulting commands are sent to target databases selected in accordance with request type, user account defaults and selections, and established permissions 712.

Figure 7B:
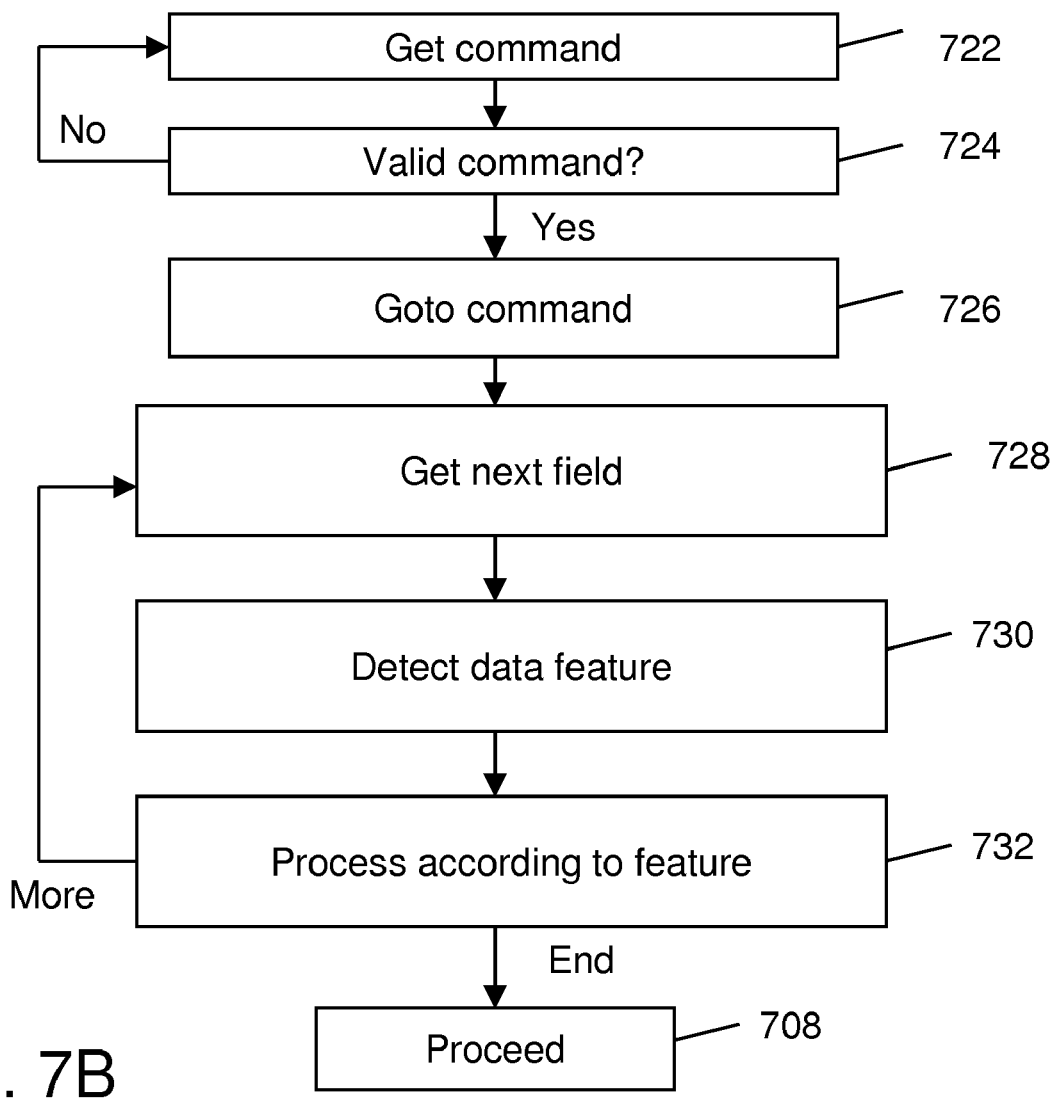
FIG. 7B illustrates the steps associated with parsing a user input string.

FIG. 7B illustrates the steps associated with parsing a user input string. In step 722, a letter is examined. If the letter is a delimiter it is ignored and the next letter is examined. If the letter is a valid command 724 the process branches to the code for parsing the respective command 726. Each command processes each following character by removing delimiters and assembling sequential characters into a field string 728. Each field is examined for some feature 730 according to procedures specific to the command to determine the type of data and validity of data in each field. Each field is processed to the end of the input 732. When completed, the field is displayed 708 as described in FIG. 7A.

The following identifies the processing considerations for each Universal Transaction code of FIG. 6. Each example is further illustrated by an associated figure.

"A". Article. Articles are typically property articles such as personal property that has a value. The Article transaction code includes a type code. Several exemplary type codes include "MACCORD", and "RCELTEL", which define the musical instrument the accordion and a cellular telephone respectively. Type codes have a characteristic format of 4 to 7 alphabetic characters.

Figure 8:
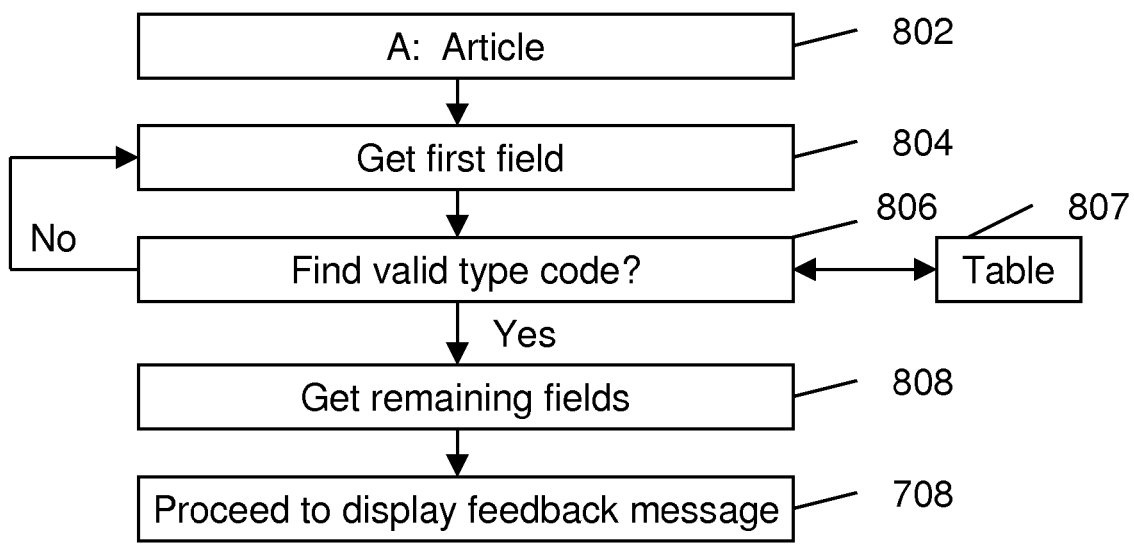
FIG. 8 illustrates the steps for processing transaction code "A".

Referring to FIG. 8 for transaction code "A" 802, if a field 804 contains a string in accordance with the type code format 806 and can be found in a type code table 807, it will be interpreted as a type code. Otherwise, the entry will be ignored. Remaining fields may be copied as description 808.

"B". Boat. The registration data has a well defined, fixed format that begins with two character codes from a table, followed by numeric digits. The target state can be identified from the registration data. If the field does not meet the requirements for registration, it is considered a hull number query.

Figure 9:
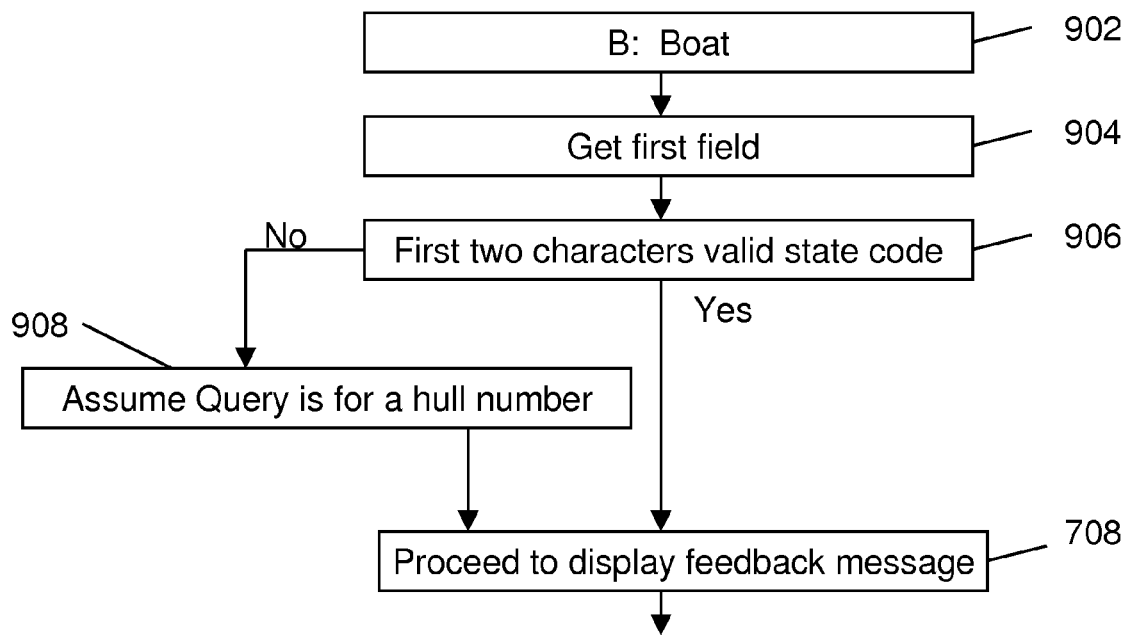
FIG. 9 illustrates the steps for processing transaction code "B".

Referring to FIG. 9 for transaction code "B" 902, if a field 904 begins with two letters that are a valid state code 906, the state code format is assumed, otherwise 908, the hull number format is assumed.

"C". Criminal Record Check. The first field is the ID number appropriate to the data source. The second field, "state," if present, can be verified against a table of state codes. If there is no match, the field may be ignored.

"D". Person check by Driver's License Number. The second field, "state," if present, can be verified against a table of state codes. If there is no match, the field may be ignored.

Figure 10:
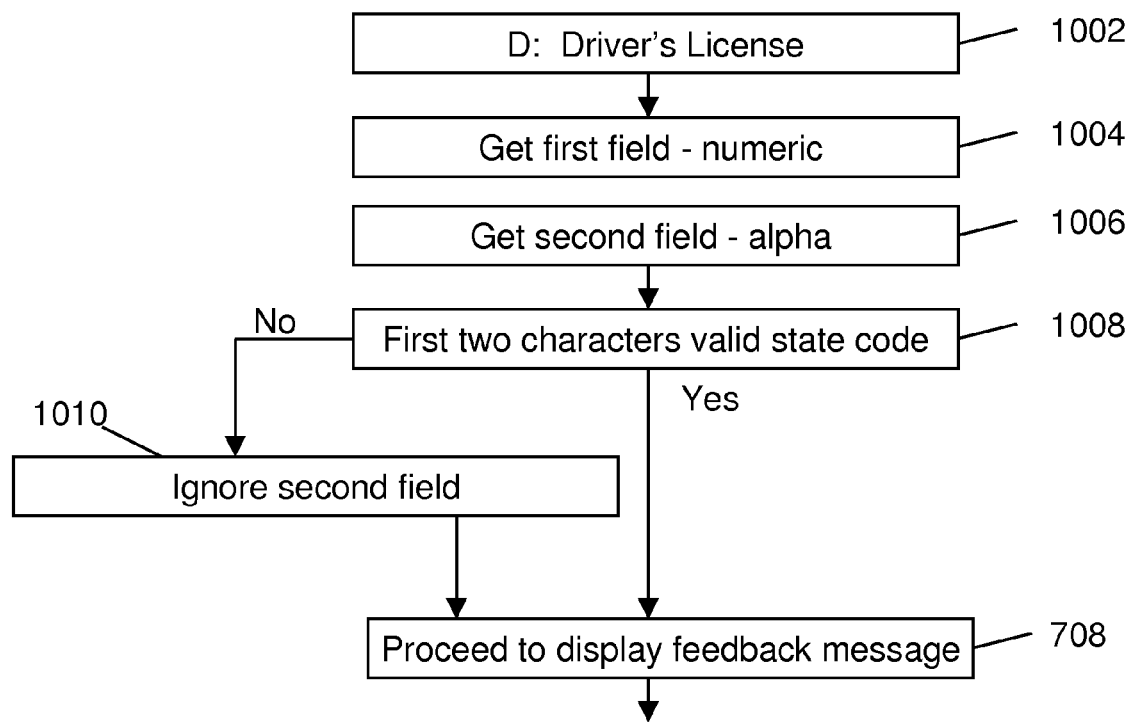
FIG. 10 illustrates the steps for processing transaction code "D".

Referring to FIG. 10 for transaction code "D" 1002. The first field 1004 should be a numeric driver's license number, if not, an error is noted. The second field is optional and may be a two letter state code 1006. If present, the code is checked against a table of valid codes 1008. If valid, the state is displayed 708, otherwise ignored 1010.

"F". Female person check by name and DOB. The name should be the first parameter. The date of birth (DOB) or state code may follow in either order. Since there may or may not be a middle initial, and the middle initial does not have to be accounted for, the detection of either an 8 character numeric field or a 2 character field that has a valid state or region code signifies the end of the name. The DOB or state code can thus follow in either order. Note that the sex is indicated in the transaction code, obviating the need for separate entry of the person's sex.

Figure 11:
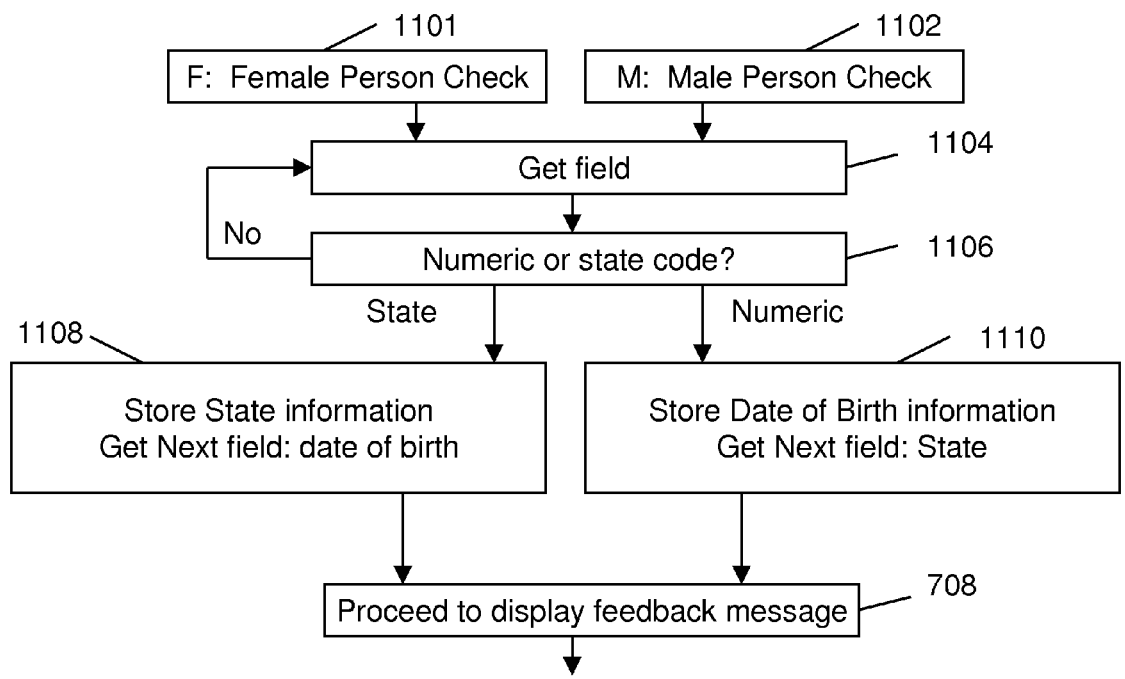
FIG. 11 illustrates the steps for processing transaction code "F" or "M".

Referring to FIG. 11 for transaction code "F" 1101. Upon entry 1101 or 1102, the sex attribute is noted. The first several fields are collected in the loop 1104 and 1106 until a valid state code or numeric string is detected. A valid state code should be followed by a date of birth. 1108. Conversely a valid date of birth may be followed by a state code 1110. The results are then displayed 708.

"G". Gun check. The make field must come from a table, and thus is distinctive. The caliber is all numeric. Thus these fields can be identified and processed, but will be ignored if erroneous.

Figure 12:
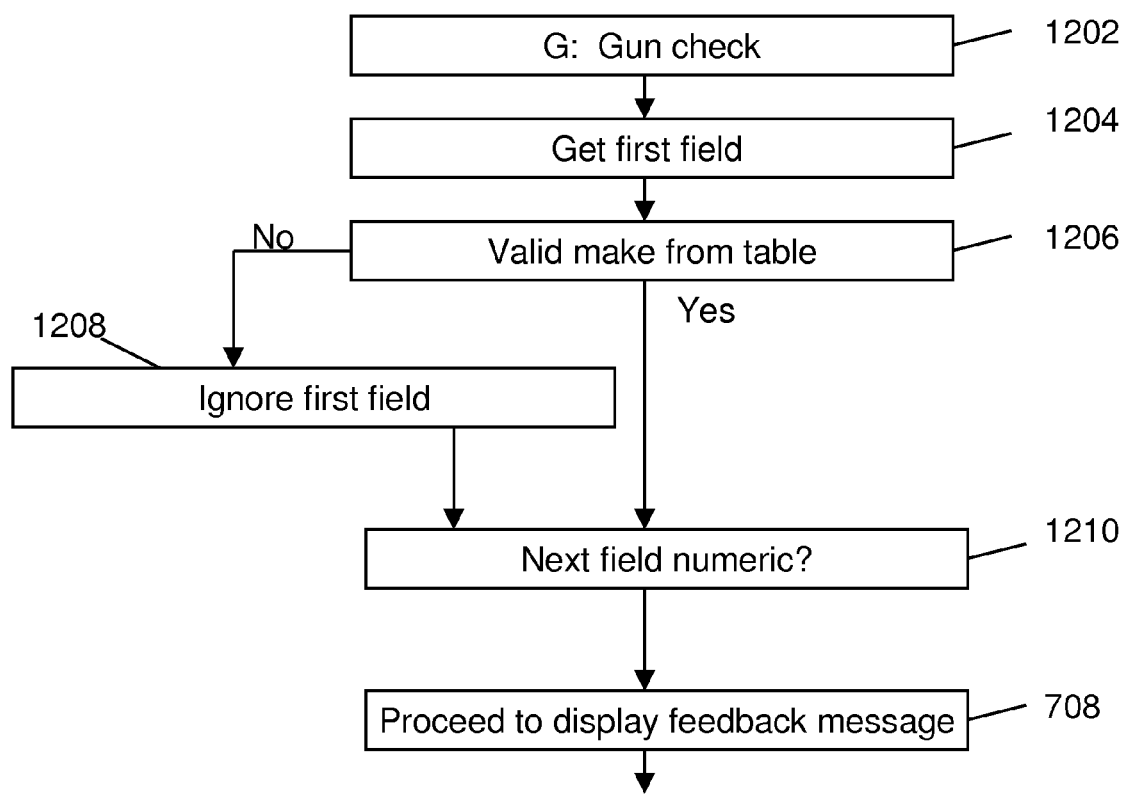
FIG. 12 illustrates the steps for processing transaction code "G".

Referring to FIG. 12 for transaction code "G" 1202. The first field 1204 should be a make and should be found in a table 1206, if not, ignored 1208. The next field should be numeric 1210. If not, ignored. The results are then displayed 708.

"H". Hazardous Materials. Hazardous materials may be entered by the UNN (United Nations Number) or railroad tank car designation. The UNN field is distinctive with 4 numeric characters, where as a railroad tank car has a distinctive reporting mark structure that always begins with an alphabetic character.

"I". Image Query. The first parameter is the identification number of the image to be retrieved.

"L". Log User Activity. May be used to log any activity by the user for historical or narrative purposes. Exemplary activities may include the noting of suspicious activity or the recording of time spent off duty.

"M". Male person check. See "F", "Female person check," above.

"O". Protective Order Check. May use the same parameters as the M or F person check, but may be treated differently because of state data transfer rules.

"P". License Plate. The state and type codes are from validated tables, and thus can be determined. Note that in a query, only a few type codes are used, and they do not conflict with state codes. Invalid codes will be ignored.

"Q". Query. Performs the query provided.

"S". Person check by Social Security Number. There is only 1 parameter, and this function is deterministic.

"T". To: Send a message to a user. First parameter is the User ID. The second parameter is the message text.

"U". Unit Status Check from a Computer Aided Dispatch System (CAD). Without a parameter provides status of all units. With a unit specified, the system returns the status of the specified unit.

"V". Vehicle check by VIN Number. The state codes and vehicle make codes come from tables and do not conflict, and thus they are deterministic. Invalid codes will be ignored.

"W". Severe Weather Check. Retrieves local weather unless a state is specified.

"X". Specific agency transaction. The format will be determined by the actual transaction. Note that there will always be a "sub transaction code" after the "X", which signifies the actual agency transaction code. These may chain further, if needed.

Figure 13:
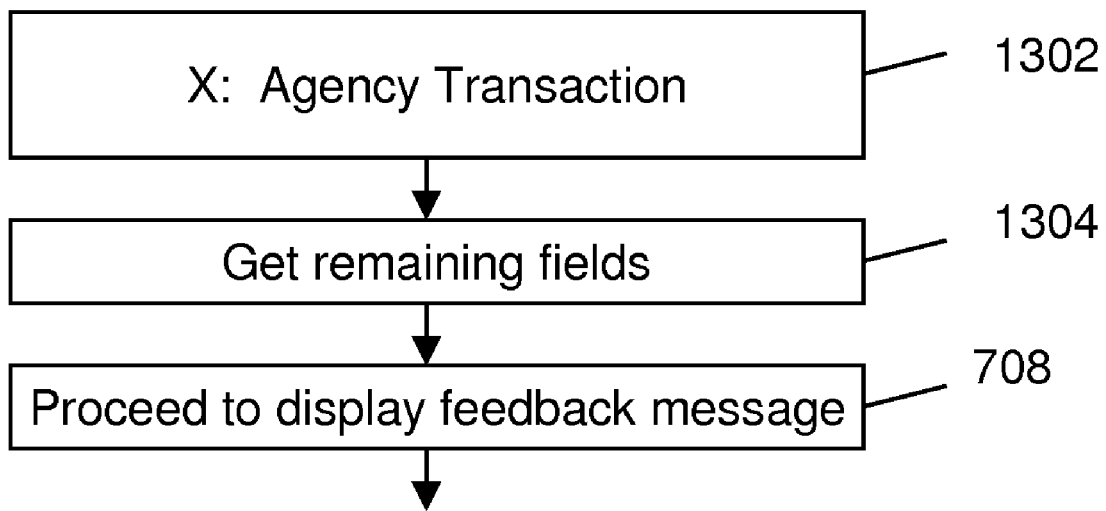
FIG. 13 illustrates the steps for processing transaction code "X".

Referring to FIG. 13 for transaction code "X" 1302. The fields are processed 1304 and passed on to the agency 708. Agency codes may be programmed as an extension of the lexicon, or may be piped through without conversion.

"Y". Reserved for future use. It is expected that a transaction will be added, and "Y" is reserved as a placeholder for expansion with compound transaction codes, for seldom used functions, essentially providing a "sub menu" extended by the compound transaction code.

Figure 14:
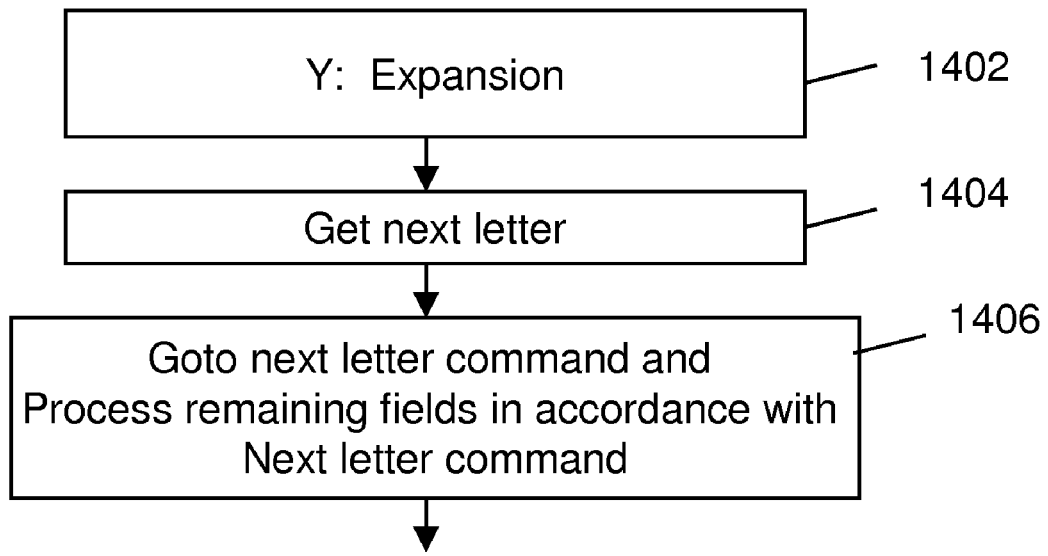
FIG. 14 illustrates the steps for processing transaction code "Y".

Referring to FIG. 14 for transaction code "Y" 1402. The first field 1404 is a one letter expansion transaction code. The following processing is dependent on the one letter command 1406.

"Z". Emergency message to agency. The data following the code is sent to the agency and all its users, without inspection.

Figure 15:
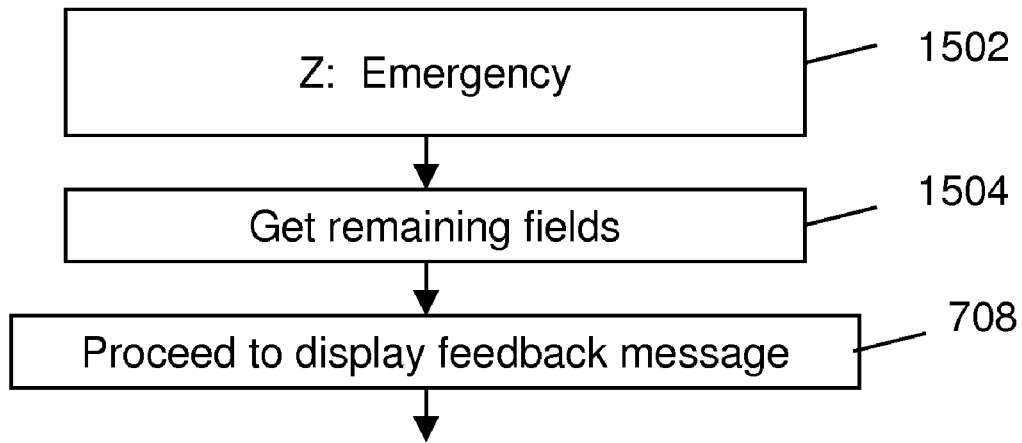
FIG. 15 illustrates the steps for processing transaction code "Z".

Referring to FIG. 15 for transaction code "Z" 1502. The fields 1504 are sent as is.

"?". Help. Displays available commands and parameters. Note that the help command need not generate a message to the databases.

Figure 16:
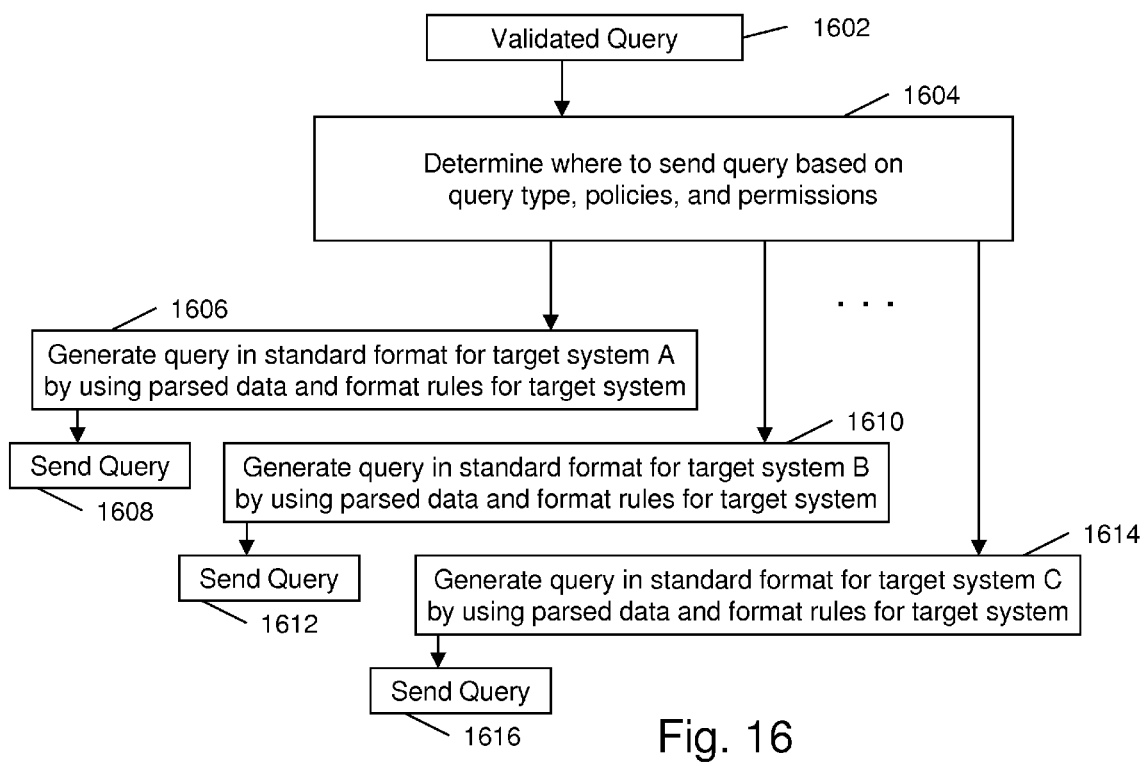
FIG. 16 illustrates the processing steps performed after the query is validated by the user.

FIG. 16 illustrates the processing steps performed after the query 1602 is validated by the user. Referring to FIG. 16, the destination databases and system are determined from the query type, i.e., person check, gun check, and HazMat queries go to different databases. Databases are further selected based on the user's agency preferences and requirements. Finally, user requests and preferences are included. 1604. Once a set of databases is established, the query is converted to the correct format for each respective database 1606, 1610, and 1614. Conversion to each format should be a straightforward application of assembling the string field data into the documented format for the respective database. The process should be within the ordinary skill of those in the art of such programming. Upon completion, each message is sent to its respective database 1608, 1612, and 1616.

Universal Message Number (UMN)

One embodiment of the present invention includes a method for referencing messages within a law enforcement database and reporting system. The method is based on a universal message number, which may be used as an index for storage and retrieval of message. The UMN may be applied to any message traffic both within and outside the realm of an individual agency, and provide immediate indexing and routing of any message, plus allow for "marshalling" of and tracking of messages returned from various data sources responding to a common, singular, request by a user. The UMN is of sufficient capacity to permanently store messages by indexing them using the UMN.

The message number being permanently assigned to the message means that there is no anticipated need to reuse a message number, thus eliminating ambiguity in the reference of a message number, for the foreseeable, expected, life of the system. System life may be indefinite, but systems typically become obsolete in ten to twenty years. Even if the system is replaced, the new system could retain the old database and translate a new reference system to the old system, thus keeping the original assignment of reference number to message permanently.

One advantage of the UMN of the present invention is that the UMN may be expressed in various forms. One form is a 64 bit binary number. The 64 bit binary number format has particular advantages with respect to indexing data within a computer or system. Another format is a control field format that is useful for communication with and through established networks and databases. Still another format is an operator display format that is easier to read and remember by an operator when reviewing data.

This UNM can be presented in a format that is compatible with the NCIC and NLETS® systems, but also used for immediate indexing within an agency for any type of traffic, ranging from Database activity to person-to-person messaging. It is a unique indicator that can be applied to all messages in a system to identify a particular message, and to provide correlation to other messages in the system.

The UMN has the following beneficial properties:

The UMN can uniquely identify each message in the projected database, which may span decades or more into the future.

The UMN can be efficiently integrated into and used by algorithms.

The UMN can be usable, preferably directly, as an index for message data.

The UMN is processing platform independent.

The UMN can be converted to a display format an operator can understand intuitively.

The UMN can be converted to a data field format that can be transmitted across systems, within the limits of the data fields present as of Jan. 1, 2000.

The conversion can be reversed from the data field format back to its original (native) format The UMN can be uniquely generated from a "stateless" system, which may be operating in parallel with other systems, providing the same function, without contacting other systems in the array, or maintaining common files.

The UNM addresses computer architecture issues by utilizing a native format aligned with computer word boundaries and using binary representation. The UNM addresses network data field limitations by efficiently mapping the native data to make maximum use of the available format structure. The UNM further provides for a user friendly display and print format for improved data recognition and interpretation.

The current nationwide infrastructure, primarily the National Crime Information Center (NCIC) and the National Law Enforcement Telecommunications Network System (NLETS®) provide for persistent data to be transmitted between end points, and returned. This is known as the "control field", and is typically used by an individual system for its own purposes, typically for tracking. The most restrictive format for such a control field within the national systems is a format consisting of 10 upper case alphanumeric characters and the dash '-' character, resulting in 37 characters, 26 alpha plus ten numeric plus one dash. This permits 37 to the 10th power, or 4,808,584,372,417,849 unique control field combinations. All major interconnected systems that access NLETS are required to use a ten character alphanumeric field. However, there is no specific composition of this field required by NLETS. A typical system may incorporate a fixed system identifier followed by a numeric component to identify the message, limiting the total number of messages that can be identified without re-using numbers. In accordance with the present invention, the maximum range available to the format is used as a message number allowing sufficient range for permanent assignment of a number to a message.

The next power of 2 that is greater than 3710 is 253, (where "" represents "to the power of"). Thus, a set of numbers of 252 values or less can be mapped uniquely and reversibly to corresponding representations in the 37**10 control field space.

An exemplary UMN structure in accordance with the present invention comprises a temporal component and a sequence number component. The sequence number component may be a message sequence number, and the temporal component may represent an increment of time, for example, one day. The UMN may further include a system value to identify a system or subsystem of message origination and may further include additional bits for future definition.

For a typical computer system having a 32 bit word data type, an exemplary native UMN structure can be defined by linking a 32 bit integer value with a 16 bit integer and an 8 bit integer value. (more specifically, unsigned positive integers)

These values can be combined to create a 52 bit integer, which in general computation is a subset of a 64 bit integer. The 52 bit integer is a number that can be contained within a typical 64 bit number and utilized as a 64 bit number by neglecting unused bits. Note that a local system may wish to expand to the full 64 bit integer by defining unused bits, but the full 64 bit number may not be able to be exposed nationally due to the 10 character format limitation and thus would be limited to use within the bounds of the local system. The 64 bit integer can be created in a format that allows arithmetic operations and manipulation. By defining the message sequence number portion as 32 bits and placing the temporal and system information in a separate 32 bit word, the design allows for efficient operation in both 32 and 64 bit instruction set modes.

In accordance with one aspect of the present invention, it is desirable to provide a number that may be permanently assigned to a message for the life of the system and/or database. It is also desirable that the number be usable to access messages by indexing, i.e. by direct calculation and/or table lookup of the message address without searching a list or database for the message or an attribute of the message.

A new system being introduced would hopefully have a life of greater than ten years. The cost of training, hardware and software infrastructure, and the cost of historical data conversion to a format of a new system suggest that major system architecture changes should not be undertaken frequently. However, technology changes rapidly and systems administrators must respond to the demand for the benefits of the new technology, thus, new systems inevitably have a finite life time. However, Systems designers can learn from the Y2K experience (Year 2000 date change computer format issue) that one needs to plan for the extended life of a system and, in particular, the life of data structures that may outlive one system and transition to the next. Thus, ten years of data is a bare minimum. A better life time is twenty years. Fifty to one hundred years lifetime seems to have sufficient margin to expect that technology will obsolete the data structure before the data structure runs out of room. Now, how much index space is needed? At a typical present system message rate of one million messages per day, ten years of messages would be 3650 million messages. 3650 million could be expressed as ten numeric digits and passed through NLETS control field using only numeric digits. Thus, in one embodiment of the invention, the index could be a ten digit base ten number by eliminating fixed system identifiers or multiple fields passed in the control field value and dedicating the entire ten digit control field to the index number. However, a ten digit base ten number has issues relating to the short life time (ten years at 1 million per year) and inevitable increase in traffic over time. The increase in traffic will shorten the life time to less than ten years. It would not be unreasonable to expect a ten fold increase in traffic over ten years. A better solution uses alpha characters to provide additional symbols per digit and represents the message index number as a numerical base higher than ten. A base sixteen value could increase the space considerably. A base twenty value would allow even more space. A base twenty six value could be implemented using only alphabetic letters. A base 36 value could be implemented using letters and numbers. A base 37 value could be implemented using numeric, alpha and the "-" character as allowed by the NLETS® standard.

In one exemplary embodiment, there is sufficient capability in the UMN to index four billion messages per day for 178 years. The exemplary number portion of the UMN, being 32 bits allows 4 billion messages to be indexed. The temporal portion at 16 bits allows 65536 temporal increments. If the temporal increment is one day, the field will allow for nearly 178 years accumulation of messages at 4 billion messages per day. These 32 bits of number portion and 16 bits of temporal portion may be combined with four bits of system information and reversibly mapped to the ten character base 37 representation. Thus, there is sufficient capacity to accommodate message growth for database lifetimes exceeding 10, 20, 50, and 100 years or more without reusing an index value.

FIG. 17A shows an exemplary UMN in native format for a typical 32 bit machine. Referring to FIG. 17A, the native UMN format 1700 comprises a message sequence number 1702, a temporal component 1704, a system identification component 1706, and reserved bits 1708. (Note that the numbers shown in the figure are position indicators. The actual numbers would be binary 0 or 1.)

The system identification (SI) component 1706, shown as 8 bits, is an indicator assigned by the system that is using the UMN structure. Component 1706 may be typically zero for a network comprising a single system; however, the SI component 1706 allows a complex of systems, possibly distributed, to operate in parallel without the need to synchronize message traffic information across up to 16 systems by using four of the eight bits shown.

When 32 bits are used for the sequence number 1702 and 16 bits for the temporal component 1704, 4 bits are available for the SI component 1706 to remain within the 52 bit constraint for mapping to the control field. More bits can be allocated to the system component 1706 if fewer bits are used for the temporal or sequence component, or if the message will not encounter the most restrictive control field.

The temporal component 1704, shown as 16 bits, is an unsigned integer starting at 0 and incrementing for up to 65535. The actual granularity of the temporal component may be determined by the generating system implementation, and can be any desired value such as a day, a unit of 6 hours, an hour, etc, as meets the needs of that system. The granularity is not exposed to remote systems as those systems simply return the value provided. The 'base' (or stating date/time) is determined by the system implementation.

The message sequence number, shown as 32 bits, is an unsigned positive integer starting at 0 for the first access of every day after midnight, and incrementing by 1 on each access. This allows for 4,294,967,296 messages per temporal unit.

Arithmetically, the UMN may be defined as the number component plus the temporal component plus the system component shifted into such positions as to allow for arithmetic operations.

An exemplary formula for the UMN of FIG. 17A is: System component*(2**48)+Temporal component*(2**32)+ Number component.

Alternatively the UMN may be described as Sequence Number+Temporal (shifted left 32 bits)+System (shifted left 48 bits).

Thus, the UMN can operate extremely efficiently from a machine instruction point of view because the data fields are aligned with byte, word and double word boundaries of a typical machine.

Further convenience may be found in that by placing the message sequence number in the low order positions, the next sequential value may be generated simply by incrementing the whole 64 bit number. This format also allows for simple indexing operations to be defined, as the date and sequence number fields are in separate 32 bit words. This simplifies searching for records by date, as the temporal portion is date relative. The format also permits easy sorting by date or sequence number.

In order to display and process this number in messages, two external formats are defined: the operator visual display format and the user control context field format.

FIG. 17B illustrates an exemplary operator visual display format in accordance with the present invention. The operator visual display format comprises the system component (optional, not shown), and the date component 1712 followed by the number component 1714. The system component may be displayed as an integer or a mnemonic name of the system. The temporal component 1712 is typically the data or date and time expressed in a typical ASCII character format for date and time. The sequence number 1714 may be shown as an integer and may include spaces or commas or other formatting to ease review and transcription. These formats allow intuitive tracking and retrieval of messages by an operator. The display format may vary from system to system, and may be as exemplified in FIG. 17B or other formats such as the format "s-mmdd-nnnnnnn", where "s" is the system identification (if present) "mmdd" is the month and day of the date component, and "nnnnnn" is the number component.

FIG. 17B shows the user display format as would be used for the 89th message from the date of Apr. 11, 2007. The number of digits for the sequence number and the format separators will vary from system to system, but the calculations remain the same, independent of the display format.

FIG. 17C illustrates the context field format for the UMN. The User Control (Context) field format 1710 allows this number to be transmitted in messages for system such as NLETS that provide a user definable field with a field length that is exactly 10 characters long and consists of only alphanumeric characters, and a dash ("-") without spaces or special characters. The context field format must be reversible, so that when the context value is returned, the returned context value can be converted to its original 64 bit format, with all elements. The context field format expresses 52 bits of the 64 bit format in base 37 notation, using alphanumeric characters plus the dash "-", right justified, padded to the left with as many "0" equivalent characters as is necessary to create the 10 character wide data field. Note that alphanumeric includes both numeric and alphabetic characters. NLETS allows only upper case alphabetic characters.

Figure 18A:
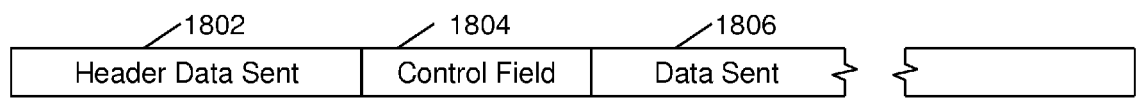
FIG. 18A and FIG. 18B illustrate the control (context) field in an exemplary message.
Figure 18B:
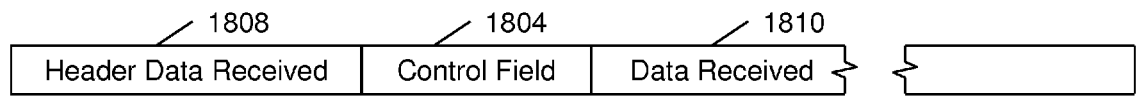

FIG. 18A and FIG. 18B illustrate the control (context) field in an exemplary message. FIG. 18A illustrates a query message sent to a database. The message typically includes some header information 1802 and data information 1806. Included somewhere in the message is the ten character control field 1804 which is copied unchanged to a corresponding field 1804 in a reply message. This field is shown in FIG. 18B, which shows the format of a reply message. The reply also includes header information 1808 and data information 1810 and includes the control field information 1804 unchanged.

Figure 19:
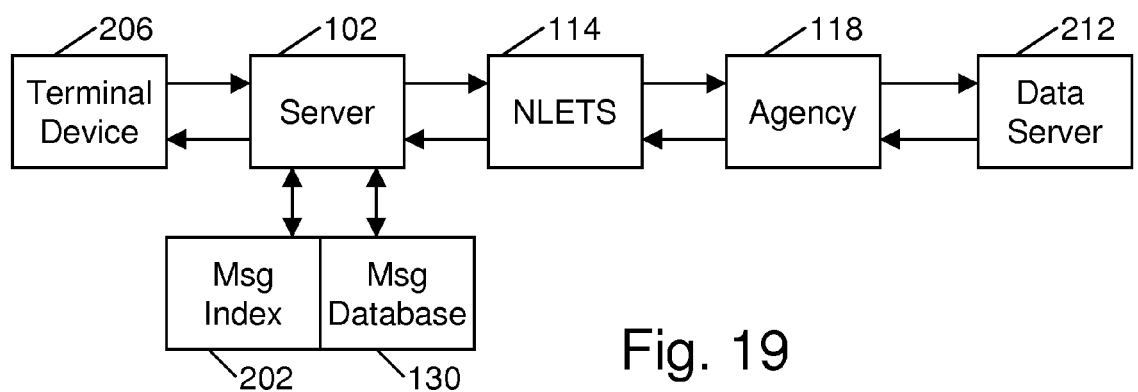
FIG. 19 illustrates an exemplary message and response path through the system and external data sources.

FIG. 19 illustrates an exemplary message and response path through the EXO system and external data sources. Referring to FIG. 19, the user enters a query through a user terminal device 206. The EXO server 102 assigns a first UMN 202, stores the message in a message database 130, and translates the query to the NLETS® format and sends the translated message and UMN, as converted to control field format, to NLETS® 114. NLETS® 114 sends the message with UMN (control field) to an agency system 118 and then to a database server 212. The database server 212 develops a reply message with reply data and copies the UMN control field data to the reply. The reply is routed through the agency 118 and NLETS® 114 to the EXO server 102. The EXO server 102 receives the reply, decodes the UMN control field and retrieves the original query and associated user information from the EXO database 130. The EXO server assigns a second UMN 202 to the received message and archives the received message in the message database 130. User security data is then processed to determine the routing and display of the received message for the user. The received message is then formatted and sent to the user terminal 206 for display.

Figure 20:
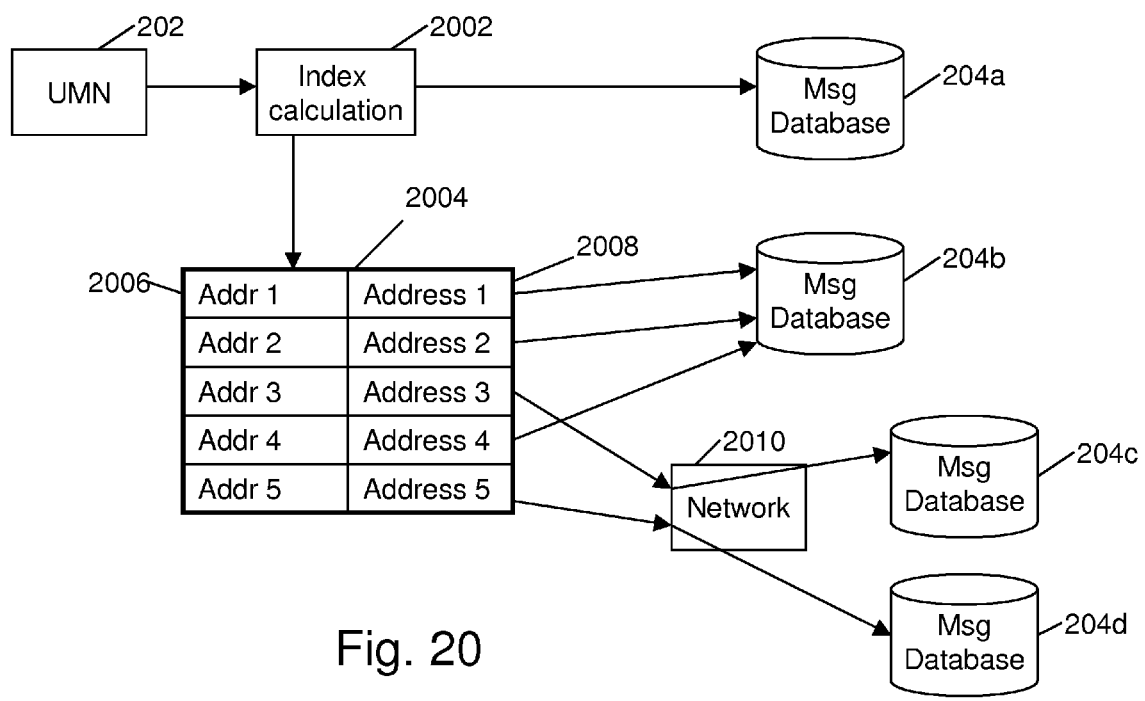
FIG. 20 illustrates several exemplary indexing operations using the UMN to retrieve a message.

FIG. 20 illustrates several exemplary indexing operations using the UMN to retrieve a message. One of the advantages of the permanent UMN is that messages may be archived based on the UMN and further that the messages may be stored and retrieved by indexing the message database based on the UMN as an index.

Messages, however, may be stored in various locations— on different disk drives, different servers, different record storages, and such as appropriate to different types of messages, which may range from a single text line to an image or video clip. Thus, it may be desirable to provide one or more stages of index translation (alternatively referred to as indirect addressing) to generate the actual address of the message given a UMN. Referring to FIG. 20, the UMN may feed an index calculation. One exemplary index calculation may include a base address and increment value per UMN increment. For example, a base address 1000 k plus and increment of 1 k per UMN increment. Alternatively the calculation may relate to a file name plus a record number. Alternatively, the calculation may involve an indirect table 2004 where the UMN identifies a table location 2006 that stores the full address 2008 of the message. Alternatively, the process may involve a combination of calculation and table lookup to achieve the most efficient storage of variable length messages. FIG. 20 shows a combination where a simple calculation 2002 stores messages on a local database 204*a* and an indirect addressing table 2004 is used to locate messages on remote databases 204*b*, even over a network 204*c* and 204*d*.

Thus, using the UMN messages can be located by direct index calculation without the need to search through a sequential list of messages to find the desired message.

Figure 21:
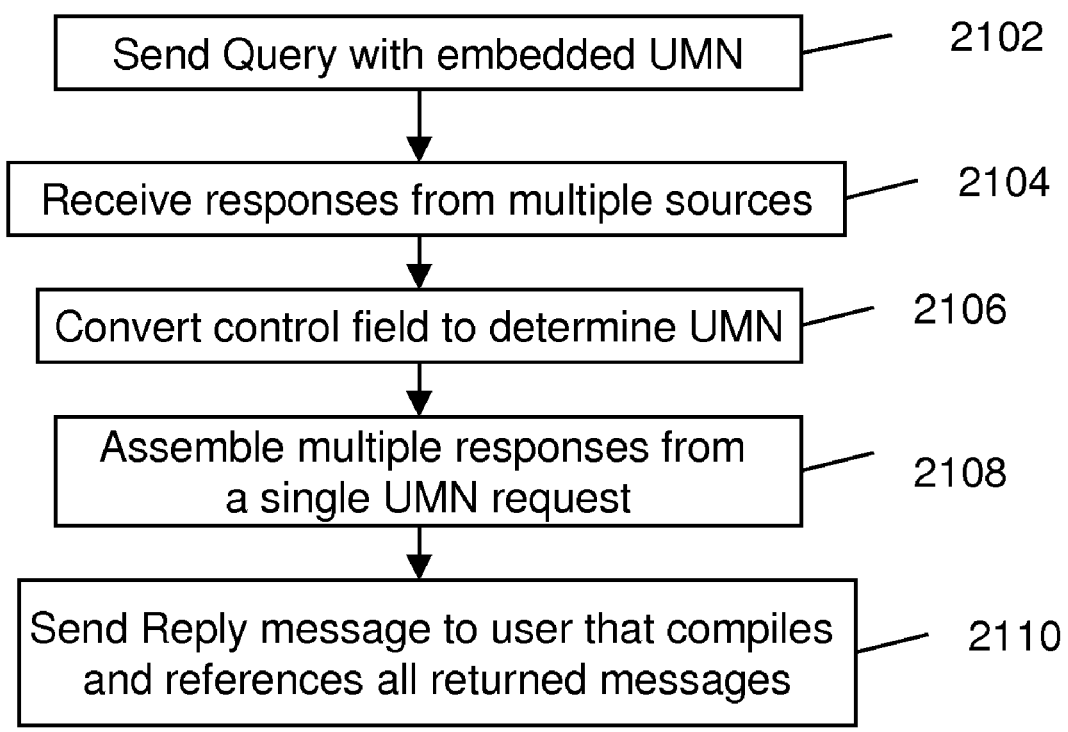
FIG. 21 illustrates a use of the UMN to collect responses from multiple data sources.

FIG. 21 illustrates a use of the UMN to collect responses from multiple data sources. When a query is sent to multiple data sources, the replies may come in at various times and may be mixed with replies from other queries. Thus, there is a need for a method for collecting the various replies and relating them to the originating query. Using the UMN to designate the original query message and embedding the UMN for the original query in the control field of the query message 2102, the received replies 2104 may be collected by recovering the UMN from each reply 2106 and assembling the reply messages or alternatively, assembling a list of reply message numbers 2108 that are associated with the original query message. Upon some trigger, such as a request by the user or an accumulation of a number of responses, or some timeout, a reply message is sent 2110 to the user that includes or references the returned messages.

The native format UMN (64 bit binary format) can be mapped to the context field format (ten character format) by various methods. One exemplary method uses the symbols available in the context format to define a base 37 number. The native 64 bit UMN binary number is converted to the equivalent base 37 number. The conversion may be performed by repetitively dividing by 37 and finding the remainder. Each remainder is then expressed in the base 37 symbol set according to a predefined table. The sequence of remainders as expressed in the base 37 symbol set becomes the context field value. Reverse conversion may be achieved by repetitively multiplying a conversion value and adding the next less significant symbol value. The details of base conversion are well known in the art.

Three exemplary correspondence tables are shown in Table 3. Table 3 shows a first correspondence (Sequence 1) starting with the alpha characters followed by the numeric characters followed by the "-" dash character. An alternative correspondence (Sequence 2) starts with the numeric characters, followed by the alpha characters and then the dash. A third exemplary correspondence (Sequence 3) mixes characters to illustrate that any predefined correspondence table may be used.

A base with fewer than 37 characters may be used, for example a base 36 conversion that does not use the dash. Fewer than 37 characters, however, do not utilize the full range capability of the 10 character standard format.

TABLE 3

| Number | Sequence 1 | Sequence 2 | Sequence 3 |
|---|---|---|---|
| 0 | A | 0 | A |
| 1 | B | 1 | Z |
| 2 | C | 2 | B |
| 3 | D | 3 | Y |
| 4 | E | 4 | 0 |
| 5 | F | 5 | C |
| 6 | G | 6 | X |
| 7 | H | 7 | W |
| 8 | I | 8 | D |
| 9 | J | 9 | 1 |
| 10 | K | A | V |
| 11 | L | B | E |
| 12 | M | C | 2 |
| 13 | N | D | F |
| 14 | O | E | G |
| 15 | P | F | U |
| 16 | Q | G | 3 |
| 17 | R | H | H |
| 18 | S | I | T |
| 19 | T | J | 4 |
| 20 | U | K | I |
| 21 | V | L | S |
| 22 | W | M | J |
| 23 | X | N | 5 |
| 24 | Y | O | 6 |
| 25 | Z | P | K |
| 26 | 0 | Q | R |
| 27 | 1 | R | 7 |
| 28 | 2 | S | L |
| 29 | 3 | T | 8 |
| 30 | 4 | U | — |
| 31 | 5 | V | M |
| 32 | 6 | W | 9 |
| 33 | 7 | X | Q |
| 34 | 8 | Y | N |
| 35 | 9 | Z | P |
| 36 | — | — | O |

The components have properties that can be used easily for indexing and calculations. The number can also be treated as a 64 bit integer (in systems that support them) by treating the number component as the low 32 bits, and the date and system components as the high order 32 bits, thus allowing direct date and sequence comparisons to be made easily.

Messages may be accessed directly across the system by indexing based on the temporal and sequence components of the UMN. Typical prior art systems allow access to messages by searching a database of messages, which is very slow and becomes impractical as the number of messages grows and spans multiple systems and databases. The UMN allows direct access to any message by referencing the message using the UMN as an index. Messages may reference multiple other messages by listing the respective UMN's. This capability is critical to meeting performance goals with increasing message traffic and expanding historical databases.

The system identification component, when used, can identify a particular message store database, or processing system, or external system that may contain message data of interest.

Security Processing Model

In order for EXO to function within the guidelines and regulations of national, state and local security policies, the EXO server must have enough information on these policies to properly and efficiently route information among the users and data providers. Further, the implementation should be both expandable and scalable to accommodate projected growth and unforeseen issues.

In accordance with the present invention, security attributes are defined for each user and separately, for each access account for each user, i.e. a user may have both secure and non-secure terminals available and it is desired to maximize the utilization of any available terminal within the parameters of governing security policies.

These policies may generally be addressed by defining two types of security properties:

Authorizations: Authorizations define which functions a user may perform. A user profile will contain Authorizations. These authorizations are based from the certifications which describe what an individual user is trained and authorized to perform.

Categorizations: Categorizations define the type of data that is being accessed, and how it can be related to the various secured or non-secure delivery channels. An access account profile will contain Categorizations.

User accounts are related to each user and each user may access the system through a number of channels, each channel having channel specific security attributes, typically defined in terms of the data that is allowed on the channel.

Although these are independent items, they are related in their application and implementation.

Authorizations.

Authorizations are applied to a request made by a specific user. In the user account profile, these will be listed, or "all" indicated by use of the "*" character.

In the database, these will be individual character string entries, such as "PER" for persons, "GUN" for gun queries, etc An authorization defines which functions (e.g. gun query, person query, etc) a user may perform. The authorizations may also be qualified by a categorization, as defined below.

Categorizations.

Categorizations define the properties of data sources and their associated security levels. They are indicated by character string codes, and can represent data sources such as NCIC, Motor Vehicle, Public Records, Hazardous Materials, etc An access account for a user will list the codes for the categories that the account can legally transmit, depending on the security applied to that account.

For example, a system using a BlackBerry Enterprise Server (BES) server with Federal Information Processing Standard, FIPS 140-2, encryption may indicate that all data may be transmitted, by user of a "*" wildcard character. Another account, such as public E-mail access such as "Hotmail" may only have the codes indicating access to Hazardous materials (e.g. "HZM") or Public records ("PBR").

This approach obviates the need to try to force all data sources into fixed categories, as it is possible that State level data may have different requirements from one to state to the next. Thus, the approach is completely open ended.

Categorization also operates with authorizations, as a user may be authorized to make person queries, but only to State or DMV files, not NCIC. In this case, the "person" authorization (e.g. "PER") would be qualified to allow only State (e.g. "STA") and DMV (e.g. "DMV") functions.

EXAMPLE

The following show examples of various combinations of authorization and categorization. In these the following assumptions are made:
PER. Person Query Authorization
GUN. Gun query authorization
PBR. Public records authorization.
NCI. NCIC data category
DMV. Motor vehicles category
PBR. Public records category
STA. State database category.

An exemplary user has full access to person queries to all categories. The user has two access accounts, one with FIPS-140-2 encryption and another with no encryption.

The user's authorization would appear as:
PER [NCI,DMV,STAS,PBR] (person queries, to the stated categories)

The profile entry controlling the response transmission for the first account (FIPS 140-2) would appear as:
* (all categories)

The second account (non-secure) would appear as:
PBR, DMV (Public records and DMV responses may be transmitted).

Thus, depending on the account from where the query was submitted, either all responses or just those within the permitted category would be returned, while other responses that could not legally be sent would be held in the database (and optionally sent to a delivery point) for later review, under appropriate security control.

Thus, a user may be able to initiate a query for information on a non-secure terminal even though all responses may not be viewed on that terminal. All responses, however, are stored and may be viewed later at a secure terminal.

CONCLUSION

One should understand that numerous variations may be made by one skilled in the art based on the teachings herein. Such variations include but are not limited to variations in the specific transaction codes or the assignment of transaction codes to function or the details of each function.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A system for accessing a law enforcement data source server comprising:
a processing server in network communication with said law enforcement data source server; said processing server being a physical computing device;
at least one channel in network communication with said processing server for receiving at least one query message from a remote user terminal;
said at least one query message including a single character transaction code and a data field, said data field providing data relating to the single character transaction code;
said single character transaction code defining a distinct query function;

said single character transaction code:
identifies the query message as a command,
indicates a distinct subject matter area for the query message,
indicates any required parameters to be found in the data field, and
indicates at least one parsing rule for the data field; and
a lexical processor associated with said processing server, said lexical processor configured for parsing said data field in accordance with said single character transaction code to generate an interpreted query message;
said processing server configured for converting said interpreted query message to an output message having a format required by said law enforcement data source server;
said processing server sending said output message to said law enforcement data source server; said processing server receiving a query response from said law enforcement data source server, said query response responsive to said output message, and said processing server delivering said query response to said remote user terminal;
wherein the single character transaction code has a predetermined position in said query message and said predetermined position is the first character or last character in the query message;
a plurality of users having a plurality of respective accounts, wherein the transaction code predetermined position is determined separately for each said account of said plurality of accounts;
wherein the single character transaction code is from a set of transaction codes, said set of transaction codes comprising a respective single character transaction code for each of the following functions:

1) "M", "m", "F", or "f", conveying male or female gender information respectively, the data field containing at least three subfields separated from one another by delimiters and distinguished from one another by an elimination process, said at least three subfields comprising a state code subfield, a date code subfield, and a first name subfield, said elimination process comprising:
said state code subfield distinguished from the other subfields of said at least three subfields by the state code subfield matching a table of state codes, said date code subfield distinguished from the other subfields of said at least three subfields by the date field being numeric, and
said first name field distinguished from the other subfields of said at least three subfields by being a sequentially first remaining subfield after identifying said state code subfield and said date code subfield;

2) "B" or "b", the data field containing one or more subfields separated from one another by delimiters, said one or more subfields including a first subfield, said first subfield identified as a state registration number by the first two characters matching an entry in a table of state codes, said first subfield identified as a hull number by said first two characters not matching any entry in said table of state codes;

3) "C" or "c", the data field containing one or more subfields separated from one another by delimiters, said one or more subfields including a first subfield, said first sequential subfield being an identification number appropriate to the data source server, a second sequential subfield being identified as a state code by the first two characters matching an entry in a table of state codes;

4) "D" or "d", the data field containing one or more subfields separated from one another by delimiters, said one or more subfields including a first sequential subfield, said first sequential subfield being identified as a drivers license number if the first sequential subfield is all numeric; a second sequential subfield being identified as a state code if a first two characters are found in a table of valid state codes;

5) "G" or "g", the data field containing one or more subfields separated from one another by delimiters, said one or more subfields including a first sequential subfield, said first sequential subfield being identified as a make identifier by matching the first subfield with an entry in a table of valid make identifiers, if no match is found, said first subfield is ignored;
a second sequential subfield is identified as a model number if the field is numeric;

6) "H" or "h", the data field containing one or more subfields separated from one another by delimiters, said one or more subfields including a first sequential subfield, said first sequential subfield being identified as a United Nations Number by the first character being numeric, and said first sequential subfield being identified as a railroad tank car number by said first character being alphabetic;

7) "I" or "i", the data field containing one or more subfields separated from one another by delimiters, said one or more subfields including a first sequential subfield, said first sequential subfield being an identification number for an image to be retrieved;

8) "P" or "p", the data field containing one or more subfields separated from one another by delimiters, said one or more subfields including a state code subfield distinguished from the other subfields of said one or more subfields by said state code matching an entry in a table of state codes; and
optionally including a type code subfield distinguished from the other subfields of said one or more subfields by said type code matching an entry in a table of type codes;

9) "S" or "s", the data field containing one subfield being identified as a social security number; and 10) "V" or "v", the data field contains one or more subfields separated from one another by delimiters, said one or more subfields including a state code subfield distinguished from the other subfields of said one or more subfields by said state code matching an entry in a table of state codes; and optionally including a make code subfield distinguished from the other subfields of said one or more subfields by said make code matching an entry in a table of make codes.

2. The system of claim 1, wherein the data field includes a first subfield, and a type of data contained in a first subfield of said data field is determined from a feature of the first subfield.

3. The system of claim 2, wherein the feature of said first subfield is that the first subfield is all numeric characters.

4. The system of claim 2, wherein the feature of said first subfield is that the first subfield matches an entry in a predefined table.

5. The system of claim 2, wherein the feature of said first subfield is based on a portion of said first subfield.

6. The system of claim 5, wherein said portion of said first subfield is the first two letters of said first subfield.

7. The system of claim 1, wherein said data field includes a second subfield, wherein said first subfield and said second subfield are entered in arbitrary order and the order is detected by a feature of one of said first subfield or said second subfield.

8. The system of claim 1, wherein the single character transaction code defines an additional data parameter not defined within said data field.

9. The system of claim 8, wherein the single character transaction code is "F" and the additional data parameter indicates a female attribute.

10. The system of claim 1, wherein the data field may optionally be separated from the transaction code by a delimiter character.

11. A computer readable medium containing computer readable instructions for configuring a processing server for accessing a law enforcement data source server;
    said processing server in network communication with said law enforcement data source server; said processing server being a physical computing device;
    at least one channel in network communication with said processing server for receiving at least one query message from a remote user terminal;
    said at least one query message including a single character transaction code and a data field, said data field providing data relating to the single character transaction code;
    said single character transaction code defining a distinct query function;
    said single character transaction code:
    identifies the query message as a query command,
    indicates a distinct subject matter area for the query message,
    indicates any required parameters to be found in the data field, and
    indicates at least one parsing rule for the data field; and
    a lexical processor associated with said processing server, said lexical processor configured for parsing said data field in accordance with said transaction code to generate an interpreted query message;
    said processing server configured for converting said interpreted query message to an output message having a format required by said law enforcement data source server;
    said processing server sending said output message to said law enforcement data source server; said processing server receiving a query response from said law enforcement data source server, said query response responsive to said output message, and said processing server delivering said query response to said remote user terminal;
    wherein the single character transaction code has a predetermined position in said query message and said predetermined position is the first character or last character in the query message;
    a plurality of users having a plurality of respective accounts, wherein the transaction code predetermined position is determined separately for each said account of said plurality of accounts;
    wherein the single character transaction code is from a set of transaction codes, said set of transaction codes comprising a respective single character transaction code for each of the following functions:
    1) "A" or "a", the data field containing one or more subfields separated from one another by delimiters and distinguished from one another by an elimination process, said at least three subfields comprising a type code subfield, a date code subfield, and a first name subfield, said elimination process comprising:
    said type code subfield distinguished from the other subfields of said one or more subfields by the type code subfield being the first subfield in the data field, and
    said type code validated by matching a table of type codes;

2) "M", "m", "F", or "f", conveying male or female gender information respectively, the data field containing at least three subfields separated from one another by delimiters and distinguished from one another by an elimination process, said at least three subfields comprising a state code subfield, a date code subfield, and a first name subfield, said elimination process comprising:
    said state code subfield distinguished from the other subfields of said at least three subfields by the state code subfield matching a table of state codes,
    said date code subfield distinguished from the other subfields of said at least three subfields by the date field being numeric, and
    said first name field distinguished from the other subfields of said at least three subfields by being a sequentially first remaining subfield after identifying said state code subfield and said date code subfield;
    3) "B" or "b", the data field containing one or more subfields separated from one another by delimiters, said one or more subfields including a first subfield, said first subfield identified as a state registration number by the first two characters matching an entry in a table of state codes, said first subfield identified as a hull number by said first two characters not matching any entry in said table of state codes;
    4) "C" or "c", the data field containing one or more subfields separated from one another by delimiters, said one or more subfields including a first subfield, said first sequential subfield being an identification number appropriate to the data source server, a second sequential subfield being identified as a state code by the first two characters matching an entry in a table of state codes;
    5) "D" or "d", the data field containing one or more subfields separated from one another by delimiters, said one or more subfields including a first sequential subfield, said first sequential subfield being identified as a drivers license number if the first sequential subfield is all numeric; a second sequential subfield being identified as a state code if a first two characters are found in a table of valid state codes;
    6) "G" or "g", the data field containing one or more subfields separated from one another by delimiters, said one or more subfields including a first sequential subfield, said first sequential subfield being identified as a make identifier by matching the first subfield with an entry in a table of valid make identifiers, if no match is found, said first subfield is ignored;
    a second sequential subfield is identified as a model number if the field is numeric;
    7) "H" or "h", the data field containing one or more subfields separated from one another by delimiters, said one or more subfields including a first sequential subfield, said first sequential subfield being identified as a United Nations Number by the first character being numeric, and said first sequential subfield being identified as a railroad tank car number by said first character being alphabetic;
    8) "I" or "i", the data field containing one or more subfields separated from one another by delimiters, said one or more subfields including a first sequential subfield, said first sequential subfield being an identification number for an image to be retrieved;
    9) "P" or "p", the data field containing one or more subfields separated from one another by delimiters, said one or more subfields including a state code subfield distinguished from the other subfields of said one or more subfields by said state code matching an entry in a table of state codes; and optionally including a type code subfield distinguished from the other subfields of said one or more subfields by said type code matching an entry in a table of type codes;

10) "S" or "s", the data field containing one subfield being identified as a social security number; and 11) "V" or "v", the data field contains one or more subfields separated from one another by delimiters, said one or more subfields including a state code subfield distinguished from the other subfields of said one or more subfields by said state code matching an entry in a table of state codes; and optionally including a make code subfield distinguished from the other subfields of said one or more subfields by said make code matching an entry in a table of make codes.

12. The system as recited in claim 11, wherein the transaction code is as follows:

"A" or "a", referring to an article check;
"B" or "b", referring to a boat check;
"C" or "c", referring to a criminal record check;
"D" or "d", referring to a person check by driver's license;
"F" or "f", referring to a female person check by name;
"G" or "g", referring to a gun check;
"H" or "h", referring to a hazardous materials check;
"I" or "i", referring to an image retrieval; or
"M" or "m", referring to a male person check by name.

13. The system as recited in claim 12, wherein the set of transaction codes further includes all of the following transaction codes;

"O" or "o", referring to a protective order check;
"P" or "p", referring to a license plate check;
"S" or "s", referring to a person check by social security number;
"U" or "u", referring to unit status check;
"V" or "v", referring to a vehicle check by vin number; and
"W" or "w", referring to severe weather check.

14. The system as in claim 11, wherein only upper case letters are used or only lower case letters are used.

15. The system of claim 11, further including one or more additional data fields separated by a delimiter selected from the group consisting of: space, dash, period, comma, colon, semicolon, and hyphen.

16. The system of claim 11, wherein each respective single character transaction code in the set of transaction codes need not be separated from the data field by a delimiter character.

17. The system according to claim 11, further including a plurality of additional data source servers in network communication with said processing server; wherein said lexical processor generates and sends a respective output messages to each additional data source server of said plurality of additional data source servers, at least one respective output message differing in format from another of said respective output messages.

18. The system as recited in claim 11, wherein the transaction code is "M", "m", "F", or "f", wherein said at least three subfields includes a second name field and said second name field is distinguished from the other subfields of said at least three subfields by being a sequentially second remaining subfield after identifying said state code subfield and said date code subfield.

* * * * *